US009612450B2

(12) United States Patent
Nagayama et al.

(10) Patent No.: US 9,612,450 B2
(45) Date of Patent: Apr. 4, 2017

(54) METHOD FOR PRODUCING AN OPTICAL ASSEMBLY AND METHOD FOR DESIGNING LENS FOR ASSEMBLY

(71) Applicant: Olympus Corporation, Tokyo (JP)

(72) Inventors: Norimitsu Nagayama, Tokyo (JP); Hiroyuki Seki, Tokyo (JP)

(73) Assignee: Olympus Corporation, Tokyo (JP)

( * ) Notice: Subject to any disclaimer, the term of this patent is extended or adjusted under 35 U.S.C. 154(b) by 330 days.

(21) Appl. No.: 14/564,416

(22) Filed: Dec. 9, 2014

(65) Prior Publication Data
US 2015/0089789 A1  Apr. 2, 2015

Related U.S. Application Data

(63) Continuation of application No. PCT/JP2013/077586, filed on Oct. 10, 2013.

(30) Foreign Application Priority Data

Oct. 11, 2012  (JP) .................. 2012-225926

(51) Int. Cl.
G02B 27/62 (2006.01)
G02B 7/02 (2006.01)
G01M 11/02 (2006.01)

(52) U.S. Cl.
CPC ......... *G02B 27/62* (2013.01); *G01M 11/0221* (2013.01); *G02B 7/021* (2013.01);
(Continued)

(58) Field of Classification Search
CPC ......... Y10T 29/49764; Y10T 29/49769; Y10T 29/49771; Y10T 29/49778; Y10T 29/4978;
(Continued)

(56) References Cited

U.S. PATENT DOCUMENTS

2005/0225774 A1* 10/2005 Freimann ........... G01M 11/0214
356/515
2011/0257930 A1* 10/2011 Gourraud ............. B24B 13/005
702/150

FOREIGN PATENT DOCUMENTS

JP      H11-176744 A    7/1999
JP      2002-139663 A   5/2002
(Continued)

OTHER PUBLICATIONS

International Search Report for PCT/JP2013/077586, mailing date Jan. 14, 2014.

*Primary Examiner* — Jermie Cozart
(74) *Attorney, Agent, or Firm* — Arent Fox LLP

(57) ABSTRACT

An method for producing an optical assembly includes a first assembling step of assembling lenses from a first lens to an (n−1)-th lens (where n is an integer of 1<n≤N) to a lens-holding member to assemble a pre-assembly; an optical property-measuring step of measuring optical properties of a first optical system in the pre-assembly; an optical parameter correction value-calculating step of obtaining displacement amounts from design values of the optical properties of the first optical system based on measurement results of the optical properties, and changing the optical parameters of at least the n-th lens itself from design values thereof, thereby calculating correction values of the optical parameters of the n-th lens; a lens-producing step of producing the n-th lens based on the correction values; and a second assembling step of assembling the n-th lens produced in the lens-producing step to the pre-assembly.

9 Claims, 18 Drawing Sheets

(52) U.S. Cl.
CPC ........... G02B 7/023 (2013.01); *Y10T 29/4978* (2015.01); *Y10T 29/49764* (2015.01); *Y10T 29/49769* (2015.01); *Y10T 29/49771* (2015.01); *Y10T 29/49778* (2015.01); *Y10T 29/49947* (2015.01); *Y10T 29/49998* (2015.01)

(58) Field of Classification Search
CPC .. Y10T 29/49998; G02B 27/62; G02B 7/021; G02B 7/023; G01M 11/0221
See application file for complete search history.

(56) References Cited

FOREIGN PATENT DOCUMENTS

| | | | |
|---|---|---|---|
| JP | WO 03019547 A1 * | 3/2003 | ............. G02B 7/021 |
| JP | 2004-258179 A | 9/2004 | |
| JP | 2004-287353 A | 10/2004 | |
| JP | 2010-243961 A | 10/2010 | |
| JP | 2011-095492 A | 5/2011 | |

* cited by examiner

METHOD FOR PRODUCING AN OPTICAL ASSEMBLY AND METHOD FOR DESIGNING LENS FOR ASSEMBLY

This application is a continuation application based on PCT/JP2013/077586, filed on Oct. 10, 2013 and claiming priority based on Japanese Patent Application No. 2012-225926, filed in Japan on Oct. 11, 2012. The contents of both the Japanese Patent Application and the PCT Application are incorporated herein by reference.

TECHNICAL FIELD

The present invention relates to a method for producing an optical assembly and a method for designing a lens for assembly.

BACKGROUND ART

In the related art, when an optical element is used in an optical instrument, an optical assembly in which a plurality of the optical elements are combined and the relative positions thereof are fixed is used. As an example of such an optical assembly, for example, an optical unit in which a plurality of lenses are fixed to a holding frame can be mentioned.

In recent years, an improvement in performance of the optical instrument has been required, and the required quality of the optical properties of the optical assembly is also made high with this improvement.

In order to improve the optical performance of the optical assembly, it is necessary to improve the part precision of the respective optical elements or the holding frame included in the optical assembly. However, if only part precision is considered in order to achieve the required quality, there is a problem in that a processing limit is reached, or production costs are excessively increased even if processing is possible.

For this reason, for example, the optical elements or the holding frame may be stratified with shape errors and combined or assembled so that assembly errors are reduced, or the optical elements may be adjusted in positions and assembled at positions where the optical properties becomes excellent while evaluating the optical properties.

For example, in Japanese Unexamined Patent Application, First Publication No. 2010-243961, a technique is described of assembling respective lenses to a lens barrel using a lens spacing-adjusting method for bonding and fixing two lenses to the lens barrel in a state where the lenses are temporarily supported by a spacer jig, and then extracting the spacer jig.

SUMMARY OF THE INVENTION

A method for producing an optical assembly in which N (where N is an integer of two or more) lenses from a first lens to an N-th lens and a lens-holding member are assembled, the method of the first aspect includes a first assembling step of assembling lenses from the first lens to an (n−1)-th lens (where n is an integer of 1<n≤N) among the N lenses to the lens-holding member to assemble a pre-assembly; an optical property-measuring step of measuring an optical property of a first optical system including n−1 lenses in the pre-assembly or measuring an optical property of a second optical system formed by temporarily assembling a temporary assembling lens equivalent to the n-th lens based on the design value of a predetermined optical parameter to the pre-assembly; an optical parameter correction value-calculating step of obtaining a displacement amount from a design value of the optical property of the first optical system based on a measurement result of the optical property, and changing the optical parameter of at least the n-th lens itself from a design value thereof, thereby calculating a correction value of the optical parameter of the n-th lens that corrects the displacement amount; a lens-producing step of producing the n-th lens based on the correction value; and a second assembling step of assembling the n-th lens produced in the lens-producing step to the pre-assembly. The optical assembly is produced by performing the first assembling step, the optical property-measuring step, the optical parameter correction value-calculating step, the lens-producing step, and the second assembling step in this order on at least one n-th lens.

According to the method for producing an optical assembly of a second aspect, in the first aspect, the optical parameter of the n-th lens itself may be one or more kinds of optical parameters selected from a shift amount of a lens surface in a direction orthogonal to a reference axis of the n-th lens, a tilt amount of the lens with respect to the reference axis, a spacing between the lens surfaces, a surface shape of the lens surface, and a refractive index between the lens surfaces.

According to the method for producing an optical assembly of a third aspect, in the first aspect or the second aspect, the correction value of the optical parameter to be calculated in the optical parameter correction value-calculating step may include a correction value of the optical parameter that changes the arrangement of a lens surface of the n-th lens with respect to the lens-holding member.

According to the method for producing an optical assembly of a fourth aspect, in any one of the first aspect to the third aspect, in the lens-producing step, the n-th lens may be produced based on the correction value by re-processing at least a lens surface of an original lens after the original lens is produced based on the design value of the optical parameter in the n-th lens.

According to the method for producing an optical assembly of a fifth aspect, in the fourth aspect, the re-processing of at least the lens surface of the original lens may be processing of forming an adding portion on the lens surface of the original lens through resin molding using a molding tool, thereby creating a lens surface based on the correction value on a surface of the adding portion.

According to the method for producing an optical assembly of a sixth aspect, in any one of the first aspect to the third aspect, in the lens-producing step, an n-th lens having a shape based on the correction value of the optical parameter in the n-th lens may be produced from a lens material.

According to the method for producing an optical assembly of a seventh aspect, in the sixth aspect, in the lens-producing step, the n-th lens may be produced by molding the lens material using a molding tool.

According to the method for producing an optical assembly of an eighth aspect, in any one of the first aspect to the seventh aspect, the size of at least an asymmetrical component in the optical property may be measured in the optical property-measuring step, and the correction value of the optical parameter may be calculated as the displacement amount in the optical parameter correction value-calculating step so that the size of the asymmetrical component is corrected.

According to a ninth aspect of a method for designing an n-th lens among N (where N is an integer of two or more) lenses from a first lens to an N-th lens that configures an entire optical system, the method includes a first assembling step of assembling lenses from the first lens to an (n−1)-th lens (where n is an integer of 1<n≤N) among the N lenses to the lens-holding member to assemble a pre-assembly; an optical property-measuring step of measuring an optical property of a first optical system including n−1 lenses in the pre-assembly or measuring an optical property of a second optical system formed by temporarily assembling a temporary assembling lens equivalent to the n-th lens based on the design value of a predetermined optical parameter to the pre-assembly; and an optical parameter correction value-calculating step of obtaining a displacement amount from a design value of the optical property of the first optical system based on a measurement result of the optical property, and changing the optical parameter of at least the n-th lens itself from a design value thereof, thereby calculating a correction value of the optical parameter of the n-th lens that corrects the displacement amount. A lens assembled to the pre-assembly as the n-th lens is designed based on the correction value.

DESCRIPTION OF EMBODIMENTS

Figure 1A:
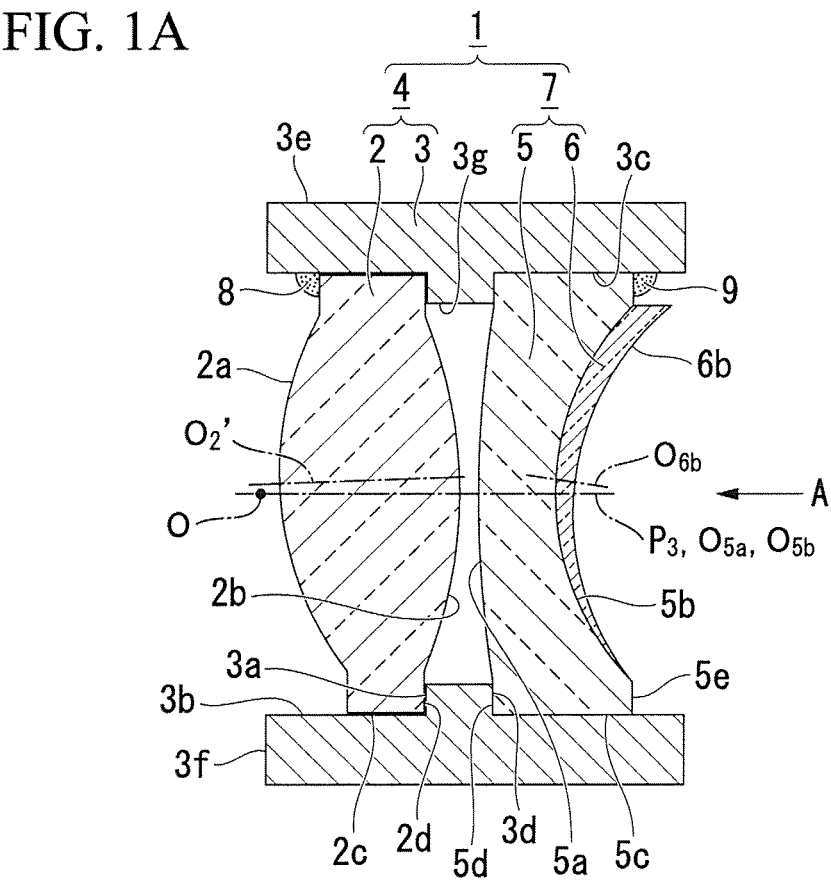
FIG. 1A is a cross-sectional view illustrating an example of an optical assembly that is assembled by a method for producing an optical assembly of a first embodiment of the present invention.

Hereinafter, embodiments of the present invention will be described with reference to the accompanying drawings. In all the drawings, even in the case of different embodiments, the same reference numerals will be given to the same or equivalent members, and common description will be omitted.

First Embodiment

A method for producing an optical assembly and a method for designing a lens for assembly in the first embodiment of the present invention will be described.

Figure 1B:
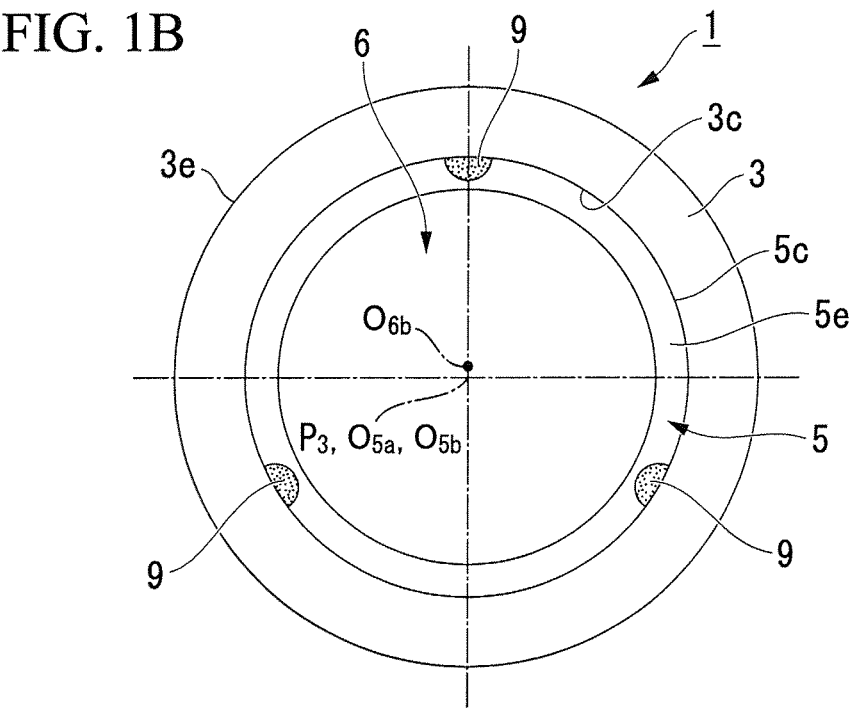
FIG. 1B is a view as viewed from A of FIG. 1A.
Figure 2:
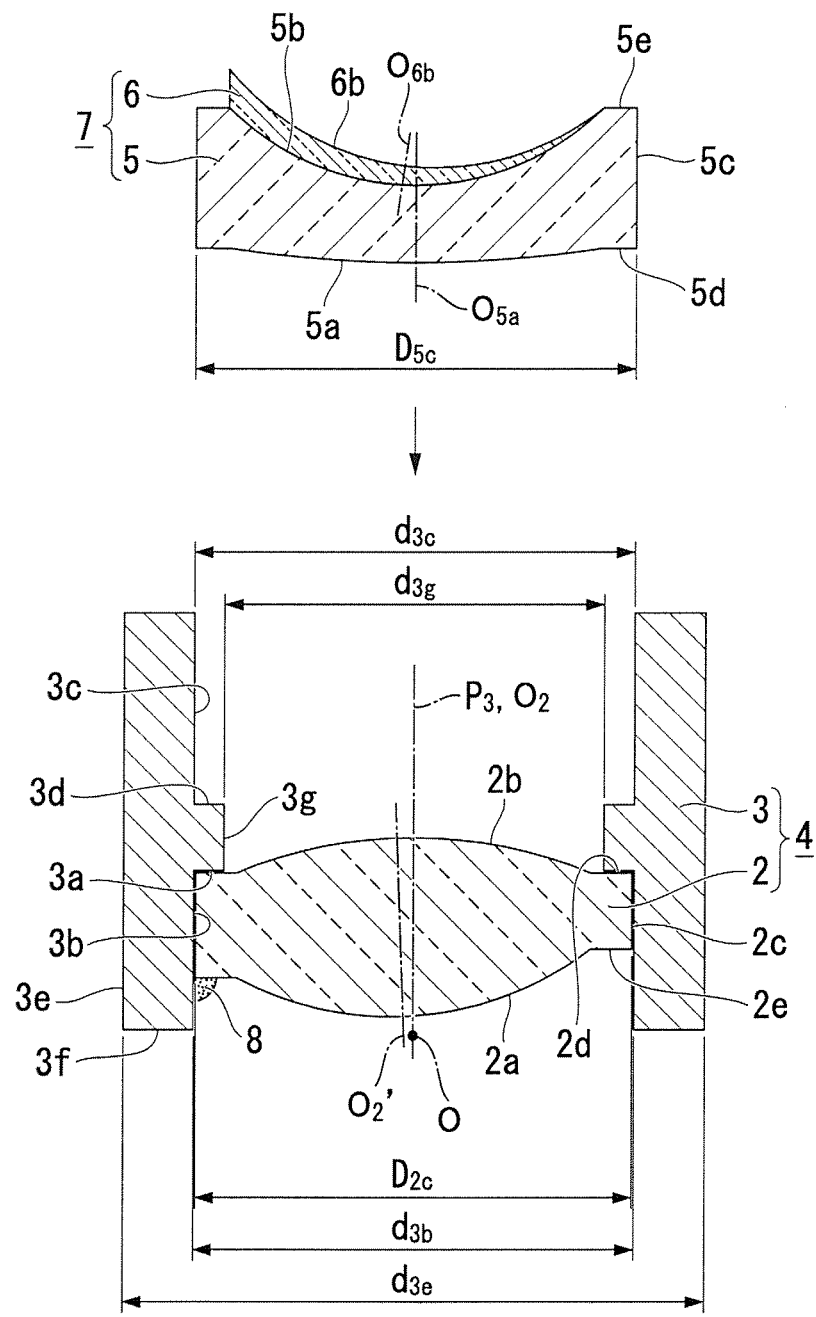
FIG. 2 is a schematic exploded view in a cross-section including an optical axis of the optical assembly of the first embodiment of the present invention.
Figure 3A:
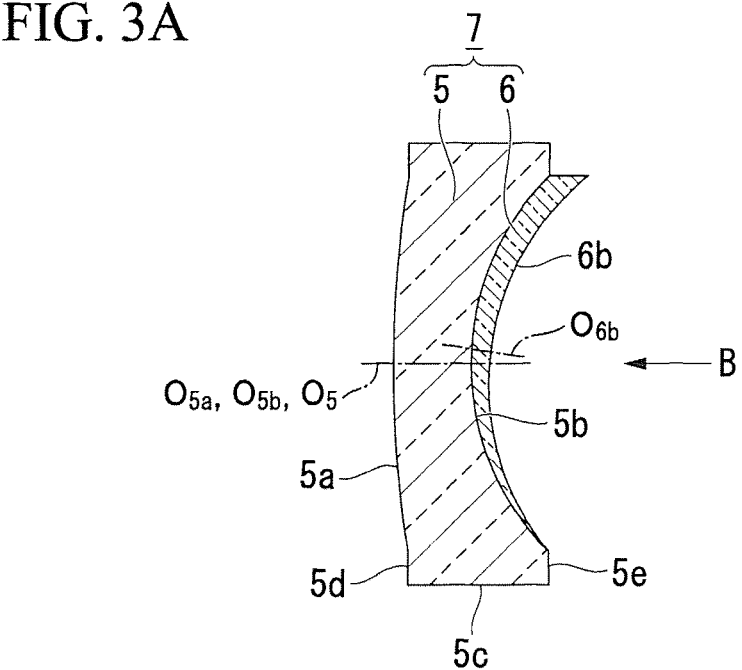
FIG. 3A is a cross-sectional view illustrating an example of a lens for assembly assembled to a pre-assembly of the first embodiment of the present invention.
Figure 3B:
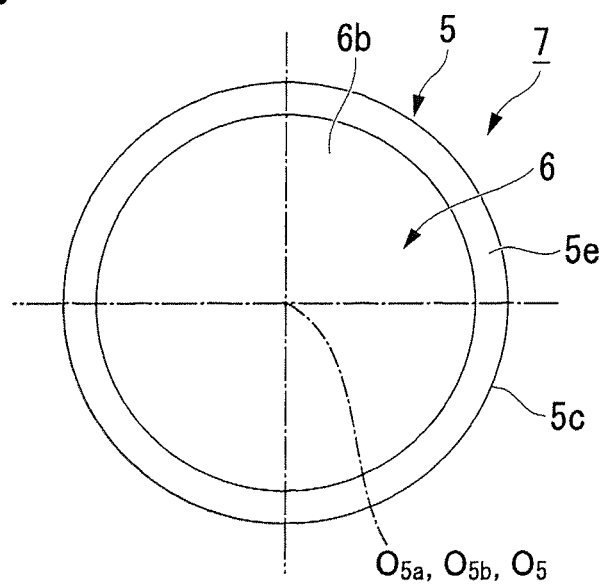
FIG. 3B is a view as viewed from B of FIG. 3A.

FIG. 1A is a schematic cross-sectional view illustrating an example of an optical assembly that is assembled by a method for producing an optical assembly of a first embodiment of the present invention. FIG. 1B is a view as viewed from A in FIG. 1A. FIG. 2 is a schematic exploded view in a cross-section including an optical axis of the optical assembly of the first embodiment of the present invention. FIG. 3A is a cross-sectional view illustrating an example of a lens for assembly assembled to a pre-assembly of the first embodiment of the present invention. FIG. 3B is a view as viewed from B in FIG. 3A.

Since the method for producing an optical assembly of the present embodiment configures an entire optical system based on design values of predetermined optical parameters, a method for producing an optical assembly in which N (where N is an integer equal to or greater than 2) lenses from a first lens to an N-th lens are assembled to a lens-holding member along a reference axis of the entire optical system includes a process of assembling lenses from the first lens to an (n−1)-th lens (where n is an integer of 1<n≤N) as a pre-assembly and assembling the n-th lens to the pre-assembly.

In the following, an optical system including the lenses from the first lens to the (n−1)-th lens in the pre-assembly is referred to as a first optical system, and an optical system including n lenses by assembling the n-th lens to the first optical system is referred to as a second optical system. That is, when the second optical system is simply referred to, the n-th lens may be the n-th lens or may be lenses other than the n-th lens.

The types of the N lenses of the optical assembly are not particularly limited. For example, a biconvex lens, a biconcave lens, a plano-convex lens, a plano-concave lens, a positive/negative meniscus lens, a cemented lens, and the like can be exemplified. Additionally, for example, a Fresnel lens or the like may be used.

Additionally, the types of the shapes of respective lens surfaces of the N lenses are not particularly limited. For example, suitable surface shapes, such as a spherical surface, an aspheric surface, a free-form surface, and a flat surface, can be adopted.

Here, the "optical assembly" means a group of assembly in which the relative positional relationship of respective optical elements is fixed, and the fixed state of the optical elements may be a permanent fixed state or may be a detachable fixed state.

Additionally, the optical assembly may have, for example, a form such that the optical assembly itself configures a product like a replaceable lens, or may be a semi-finished product, such as a replaceable unit that configures a portion of a product, or a sub-assembly that appears only in a producing process of a product. For example, when a movable lens group and a fixed lens group are respectively fixed to separate lens barrels in a zoom lens, a lens barrel unit including the movable lens group and a lens barrel unit including the fixed lens group configure the optical assembly, respectively.

In the following, a case in which the optical assembly is an optical unit 1 shown in FIGS. 1A and 1B will be described as an example.

The optical unit 1 includes a small assembly 4 (pre-assembly) and a second lens 7 (n-th lens or lens for assembly).

In the small assembly 4, as shown in FIG. 2, a first lens 2 ((n−1)-th lens) that is the first optical system is fixed to a lens holding frame 3 (lens-holding member).

In this way, in the present embodiment, the optical unit 1 is an example of a case (N=2) in which the optical unit has two lenses of the first lens 2 and the second lens 7 as lenses that configure the entire optical system.

In the present embodiment, the first lens 2 is a biconvex lens that has a first lens surface 2a including a convex surface and a second lens surface 2b including a convex surface and that has flange shapes provided on outer peripheral sides thereof, respectively.

The flanged outer shape of the first lens 2 is configured of a radial reference surface 2c that is a cylindrical surface with a diameter D2c centered on an optical axis O2, an axial reference surface 2d that is a flat surface that is formed between an outer periphery of the second lens surface 2b and the radial reference surface 2c and is orthogonal to the optical axis O2, and a planar portion 2e that is a flat surface that is formed between an outer periphery of the first lens surface 2a and the radial reference surface 2c and is orthogonal to the optical axis O2.

The first lens 2 may be a plastic lens made through synthetic resin molding or may be a glass lens made through glass mold molding or glass polishing.

Here, the optical axis O2 means an optical axis in terms of lens design. In contrast, in FIG. 2, tilt eccentricity occurs in the first lens surface 2a due to production errors. In practice, a situation in which an optical axis O2' that inclines slightly with respect to the optical axis O2 in terms of lens design is formed is drawn in an exaggerated manner.

In the following, when it is necessary to specify that an optical axis of an optical element or an optical surface deviates from a designed ideal position of the optical element or the optical system including the optical element without being limited to the above, "'" may be given to and designated by the reference numeral of the optical axis.

The lens holding frame 3 is a substantially tubular member that holds the first lens 2 and the second lens 7 therein, and is formed of, for example, metal such as aluminum, synthetic resin, or the like.

An outer peripheral surface of the lens holding frame 3, as shown in FIG. 2, includes an optical unit radial reference surface 3e having a cylindrical surface shape with an external diameter d3e, and both end portions of the lens holding frame in an axial direction are formed with flat surfaces orthogonal to a central axis P3 of the optical unit radial reference surface 3e. An end surface of the lend holding surface on one end side (lower end side of FIG. 2) in the axial direction is an optical unit axial reference surface 3f that performs axial positioning of the optical unit 1 in the axial direction.

In the present embodiment, the central axis P3 configures a reference axis on which the entire optical system is arranged, and an intersection point between the central axis P3 and the optical unit axial reference surface 3f configures a reference origin O of the entire optical system.

A hole portion opened in the optical unit axial reference surface 3f is provided inside the lens holding frame 3 in order to insert and fix the first lens 2 thereinto. A first lens radial holding surface 3b having an internal diameter d3b (where d3b>D2c) and including a cylindrical surface provided coaxially with the central axis P3, and a first lens axial holding surface 3a including a flat surface orthogonal to the central axis P3 are respectively formed in this hole portion in order to position the first lens 2 in the radial direction and in the axial direction of the lens holding frame 3.

The first lens axial holding surface 3a is formed so as to coincide with the second lens surface 2b in an arrangement position and an arrangement orientation in terms of lens design, when the first lens 2 in a case where there are neither production errors nor assembly errors in the first lens 2 (hereinafter referred to as an ideal state) is inserted into the first lens radial holding surface 3b and the axial reference surface 2d is made to abut against the first lens axial holding surface 3a.

A through-hole 3g with an internal diameter d3g (where d3g<D2c) is provided at the center of the first lens axial holding surface 3a. For this reason, the first lens axial holding surface 3a is an annular flat surface in which the internal diameter is d3g and the external diameter is d3b.

In the present embodiment, positional adjustment of the first lens 2 is not performed when the first lens 2 is assembled to the lens holding frame 3. For this reason, it is preferable that the dimensional difference between the internal diameter d3b of the first lens radial holding surface 3b and the external diameter D2c of the radial reference surface 2c of the first lens 2 be as small as possible in a range where the dimensional difference does not become a burden to processing ability.

Additionally, a hole portion opened in an end surface opposite to the optical unit axial reference surface 3f is provided on the other end side (upper end side in FIG. 2) of the lens holding frame 3 in order to insert and fix the second lens 7 thereinto. A second lens radial holding surface 3c having an internal diameter d3c (where d3c>d3g) and including a cylindrical surface provided coaxially with the central axis P3, and a second lens axial holding surface 3d including a flat surface orthogonal to the central axis P3 are respectively formed in this hole portion in order to position the second lens 7 in the radial direction and in the axial direction of the lens holding frame 3. For this reason, the second lens radial holding surface 3c is an annular flat surface in which the internal diameter is d3g and the external diameter is d3c.

The second lens axial holding surface 3d is formed so that an original lens 5 (to be described below) that is a second lens in the ideal state is positioned, and the arrangement position and the arrangement orientation of a lens surface of the original lens 5 coincide with an arrangement position and an arrangement orientation in terms of lens design.

In addition, although not particularly shown, marking for identifying a reference position in a circumferential direction around the central axis P3 when the second lens 7 is assembled is performed on the end surface of the lens holding frame 3 opposite to the optical unit axial reference surface 3f, or the optical unit radial reference surface 3e thereof.

In the small assembly 4, the first lens 2 is inserted into the hole portion having the first lens axial holding surface 3a and the first lens radial holding surface 3b of the lens holding frame 3, and the axial and radial positions of the first lens 2 are respectively determined by the first lens axial holding surface 3a and the first lens radial holding surface 3b. Here, in the present embodiment, the first lens 2 is inserted without adjustment. Therefore, the position and orientation of the first lens 2 may vary within a range of an insertion gap due to work variation.

Additionally, the first lens 2 is fixed to the lens holding frame 3 by a bonding portion 8 formed at a corner portion configured of an outer peripheral portion of the planar portion 2e of the first lens 2, and the first lens radial holding surfaces 3b.

The illustration of the bonding portion 8 in a plan view is omitted. However, in the present embodiment, for example, the planar portion 2e is formed so as to be spaced apart to positions where an outer periphery of the planar portion 2e is equally divided into three pieces. Here, when it is necessary to fix the first lens more firmly, the number of the bonding portions 8 may be further increased, or the bonding portion may be provided over the whole circumference of the planar portion 2e.

Adhesives suitable for the bonding portion 8 may include, for example, a UV curable adhesive, a two-liquid adhesive, a thermosetting adhesive, and the like.

The second lens 7 is a lens that is assembled to the small assembly 4 and configures the optical unit 1 after the small assembly 4 is assembled, and is a lens having a function to correct aberration outside of design generated by the small assembly 4 due to the production errors or the assembly errors of the first lens 2.

In the optical unit 1 of the present embodiment, it is particularly important to suppress a rotationally asymmetrical aberration component expressed by comatic aberration or astigmatism as optical properties in use.

For this reason, in the present embodiment, as shown in FIGS. 2, 3A, and 3B, a configuration including the original lens 5 and an additional lens portion 6 (adding portion) is adopted as the second lens 7.

The original lens 5 is a lens that is produced based on design values of optical parameters of the second lens arranged next to the first lens 2 in the ideal state, along the reference axis of the entire optical system, in the lens design of the entire optical system.

In the present embodiment, as an example, the original lens is a negative meniscus lens that has a first lens surface 5a including a convex surface and a second lens surface 5b including a concave surface and that has flange shapes provided on outer peripheral sides thereof, respectively.

Here, although the surface shapes of the first lens surface 5a and the second lens surface 5b are not particularly limited, both the surfaces will be described as the first lens surface 5a and the second lens surface 5b including aspheric surfaces expressed by axially symmetrical aspheric surface types as an example in the following. For this reason, the first lens surface 5a and the second lens surface 5b have optical axes O5a and O5b, respectively.

The flanged outer shape of the original lens 5 is configured of a radial reference surface 5c that is a cylindrical surface with a diameter D5c centered on an optical axis O5, an axial reference surface 5d that is a flat surface that is formed between an outer periphery of the second lens surface 5b and the radial reference surface 5c and is orthogonal to the optical axis O5, and a planar portion 5e that is a flat surface that is formed between an outer periphery of the first lens surface 5a and the radial reference surface 5c and is orthogonal to the optical axis O5.

The diameter D5c of the radial reference surface 5c is a dimension such that the original lens can slidably fit to the second lens radial holding surface 3c, and is a dimension as close to d3c as possible within a range where the assembly work is not hindered. For example, d3c-D5c is about 5 µm to about 15 µm.

Although shape errors in terms of production may be included in the outer shape of the original lens 5, a case where degradation of optical properties caused by the shape errors of the original lens 5 is negligibly small compared to degradation of optical properties caused by the production errors and assembly errors of the first lens 2 unless otherwise mentioned will be described in the following.

In such an original lens 5, it can be considered that the surface shapes of the first lens surface 5a and the second lens surface 5b are equal to aspheric surface shapes in terms of lens design. Additionally, the optical axis O5a of the first lens surface 5a and the optical axis O5b of the second lens surface 5b are aligned with the optical axis O5 as a lens, and are substantially aligned (also including a case where alignment is made) with the central axis P3 in a state where the original lens 5 is inserted into the second lens radial holding surface 3c.

Additionally, it can be considered that, when the original lens 5 is inserted into the second lens radial holding surface 3c, and the axial reference surface 5d is made to abut against the second lens axial holding surface 3d of the lens holding frame 3 and assembled to the lens holding frame 3, the arrangement position and the arrangement orientation of the first lens surface 5a substantially coincide with (including a case where coincidence is made) an arrangement position and an arrangement orientation in terms of lens design.

The original lens 5 may be a plastic lens made through synthetic resin molding or may be a glass lens made through glass mold molding or glass polishing.

The additional lens portion 6 is a shape portion to which a light-transmissive material is added in close contact on the second lens surface 5b of the original lens 5 in order to correct displacement amounts from the design values of the optical properties of the first optical system resulting from the production errors and assembly errors of the first lens 2 in the small assembly 4.

A third lens surface 6b having the same surface shape as the second lens surface 5b is formed at a position spaced apart from the second lens surface 5b, on the surface of the additional lens portion 6. Here, in the present embodiment, the third lens surface 6b does not advance onto the planar portion 5e.

The arrangement position and orientation of the third lens surface 6b with respect to the second lens surface 5b vary depending on the displacement amounts from the design values of the optical properties of the first optical system.

In the example shown in FIG. 2, since an optical axis O2' of the first lens 2 tilts within an shown sheet plane with respect to the ideal state, the third lens surface 6b is formed in a orientation where an optical axis O6b thereof has inclined in a direction opposite to the optical axis O2' with respect to the optical axis O5b.

Such an additional lens portion 6 can be added, for example, by applying a light-transmissive curable resin material on the second lens surface 5b to perform molding using a molding tool that transfers the shape of the third lens surface 6b. A detailed producing method will be described below.

The refractive index and Abbe number when a resin material that forms the additional lens portion 6 is cured may be the same as or may be different from the refractive index and Abbe number of the original lens 5.

In the following, a case where the refractive index and Abbe number of the additional lens portion 6 are the same as those of the original lens 5 will be described as an example. In this case, refraction does not occur in the second lens surface 5b that is a border surface with the additional lens portion 6.

For this reason, the second lens 7 is a meniscus lens in which a first surface is configured of the first lens surface 5a and the second surface is configured of the third lens surface 6b that is eccentric with respect to the optical axis O5b of the second lens surface 5b. In this case, since the second lens surface 5b does not function as a lens surface, the second lens surface does not exert an influence on the optical properties of the second lens 7 as long as the second lens surface is covered with the additional lens portion 6 even if there are production errors in the second lens surface 5b. This also applies to a configuration in which only the refractive index is the same, for example, when chromatic dispersion is not important as an optical property.

The second lens 7 having such a configuration, as shown in FIGS. 1A and 1B, is fixed to the lens holding frame 3 by a bonding portion 9 formed by dropping and curing an adhesive at a corner portion including the outer peripheral portion of the planar portion 5e of the second lens 7 and the second lens radial holding surfaces 3c.

In the present embodiment, for example, the bonding portion 9 is formed so as to be spaced apart to positions where an outer periphery of the planar portion 5e is equally divided into three pieces. Here, when it is necessary to fix the second lens more firmly, the number of the bonding portions 9 may be further increased, or the bonding portion may be provided over the whole circumference of the planar portion 5e.

Adhesives suitable for the bonding portion 9 may include, for example, a UV curable adhesive, a two-liquid adhesive, a thermosetting adhesive, and the like.

Next, a method for producing the optical unit 1 will be described together with a method for designing the second lens 7.

Figure 4:
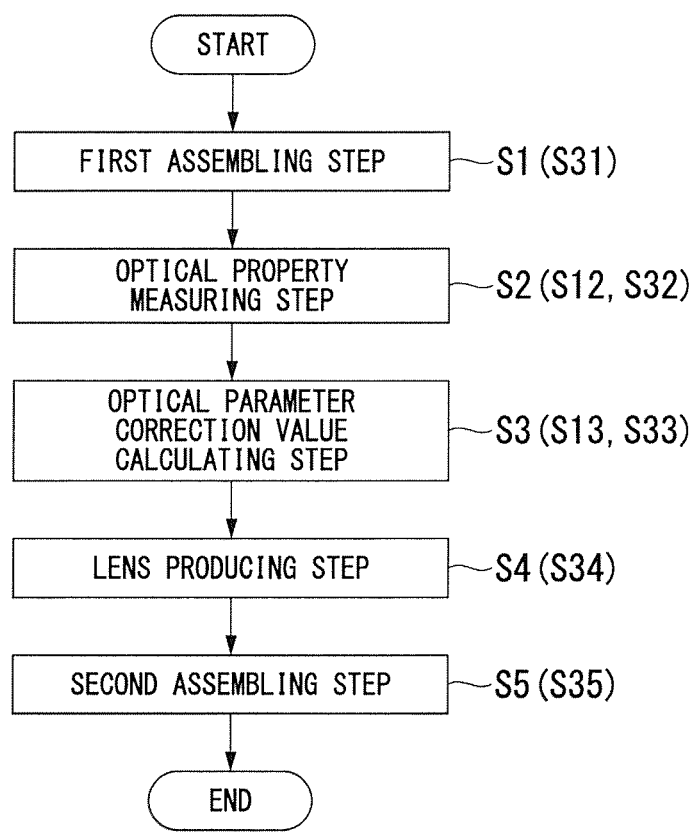
FIG. 4 is a flowchart illustrating a process flow of the method for producing an optical assembly of the first embodiment of the present invention.
Figure 5A:
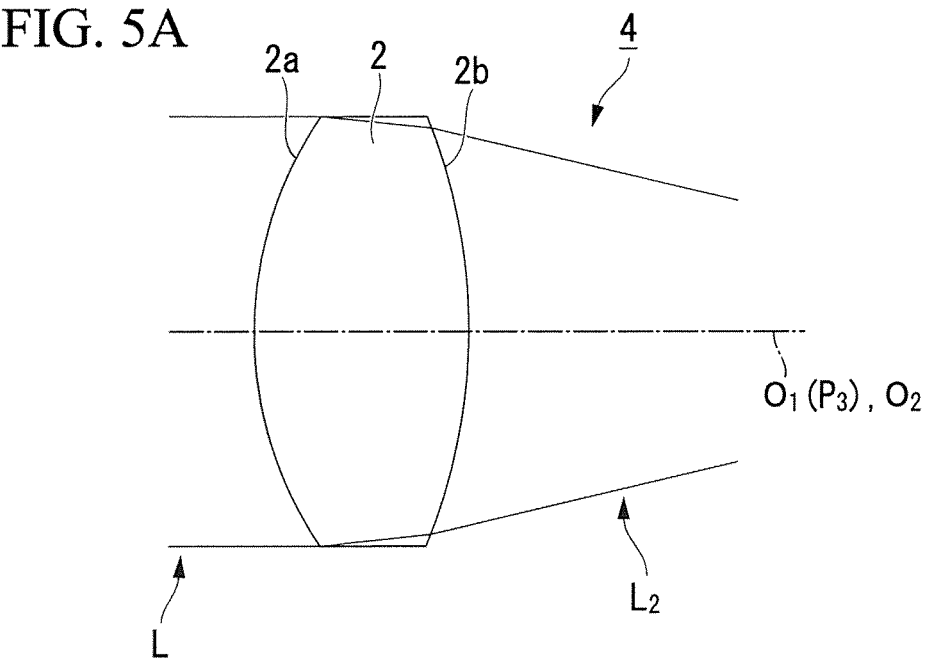
FIG. 5A is a schematic light path diagram illustrating an example of a light path having design values of a first optical system and a second optical system in the first embodiment of the present invention.
Figure 5B:
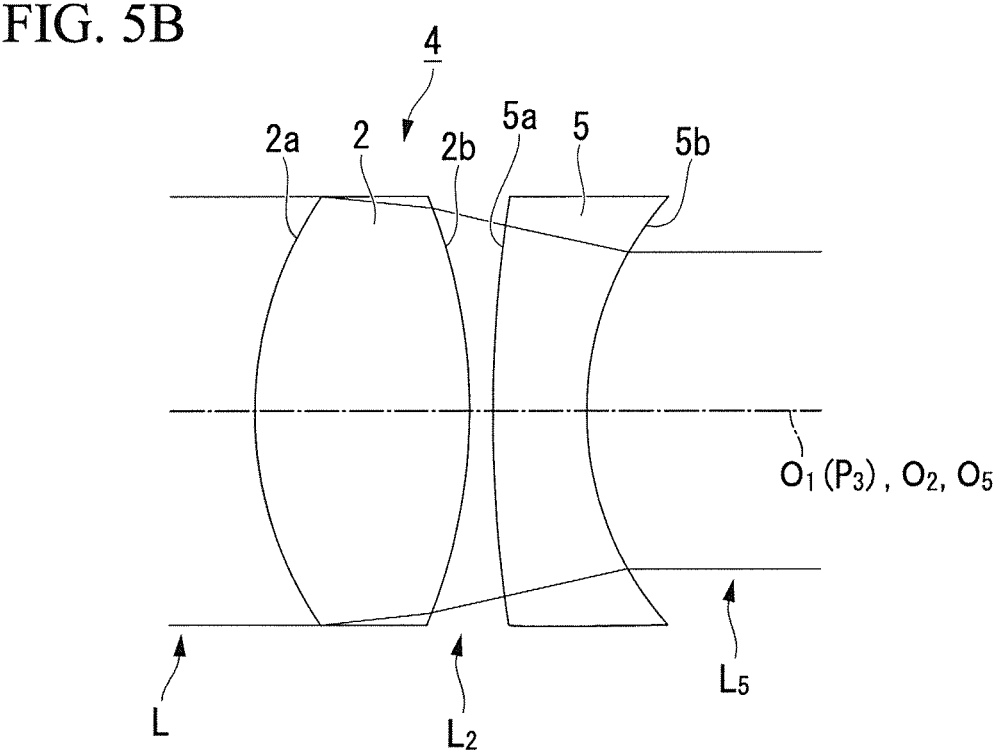
FIG. 5B is a schematic light path diagram illustrating the example of the light path having the design values of the first optical system and the second optical system in the first embodiment of the present invention.
Figure 6A:
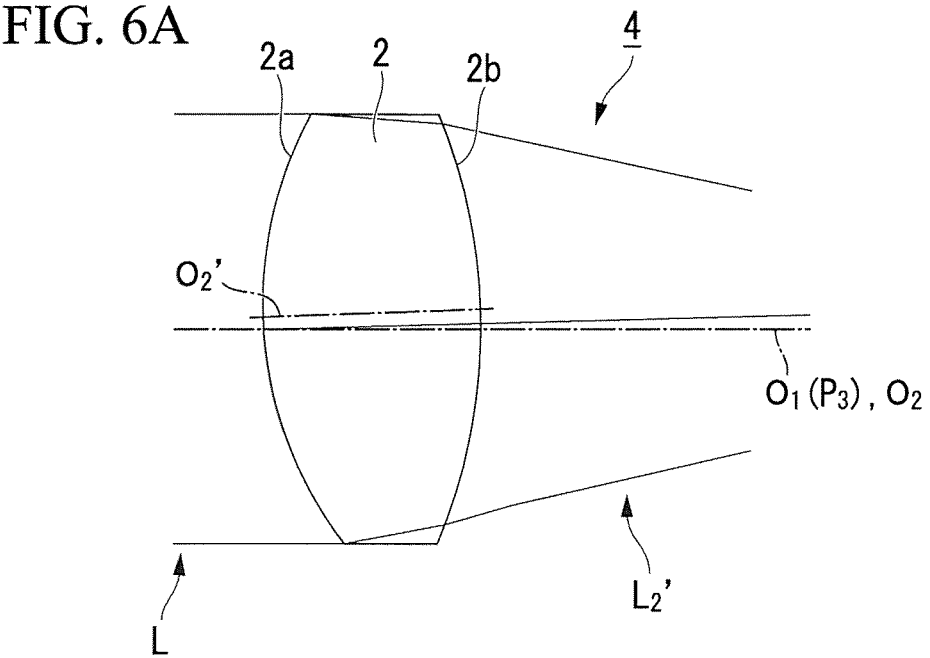
FIG. 6A is a schematic light path diagram illustrating a case where the first optical system in the first embodiment of the present invention includes production errors, and an example of a light path of the second optical system of a comparative example in that case.
Figure 6B:
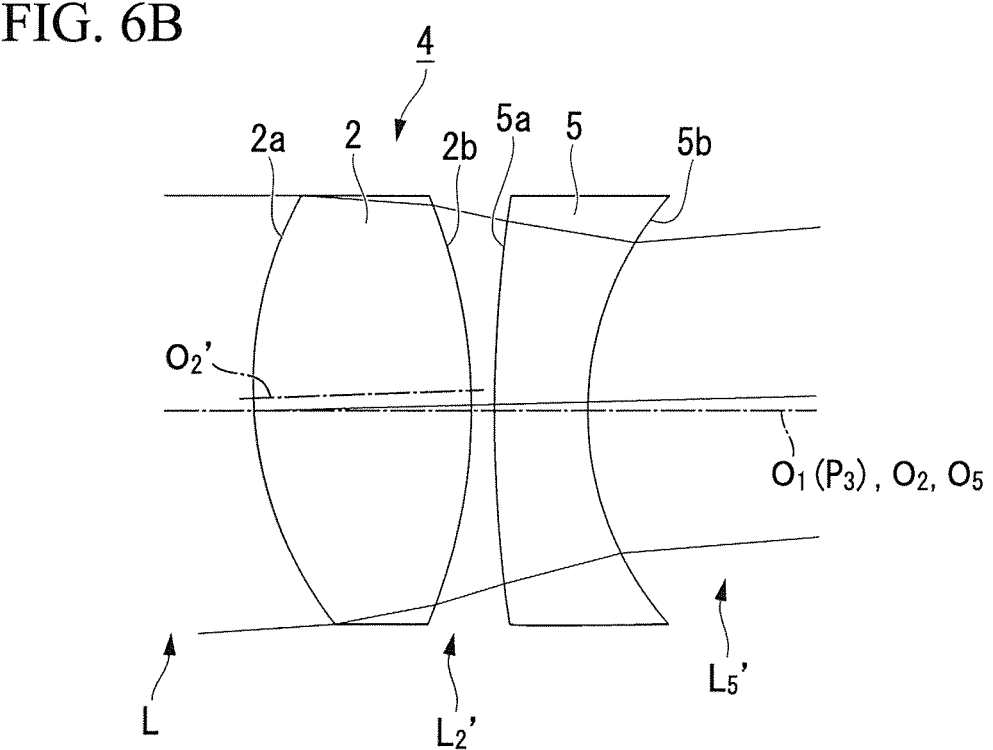
FIG. 6B is a schematic light path diagram illustrating the case where the first optical system in the first embodiment of the present invention includes the production errors, and the example of the light path of the second optical system of the comparative example in that case.
Figure 7:
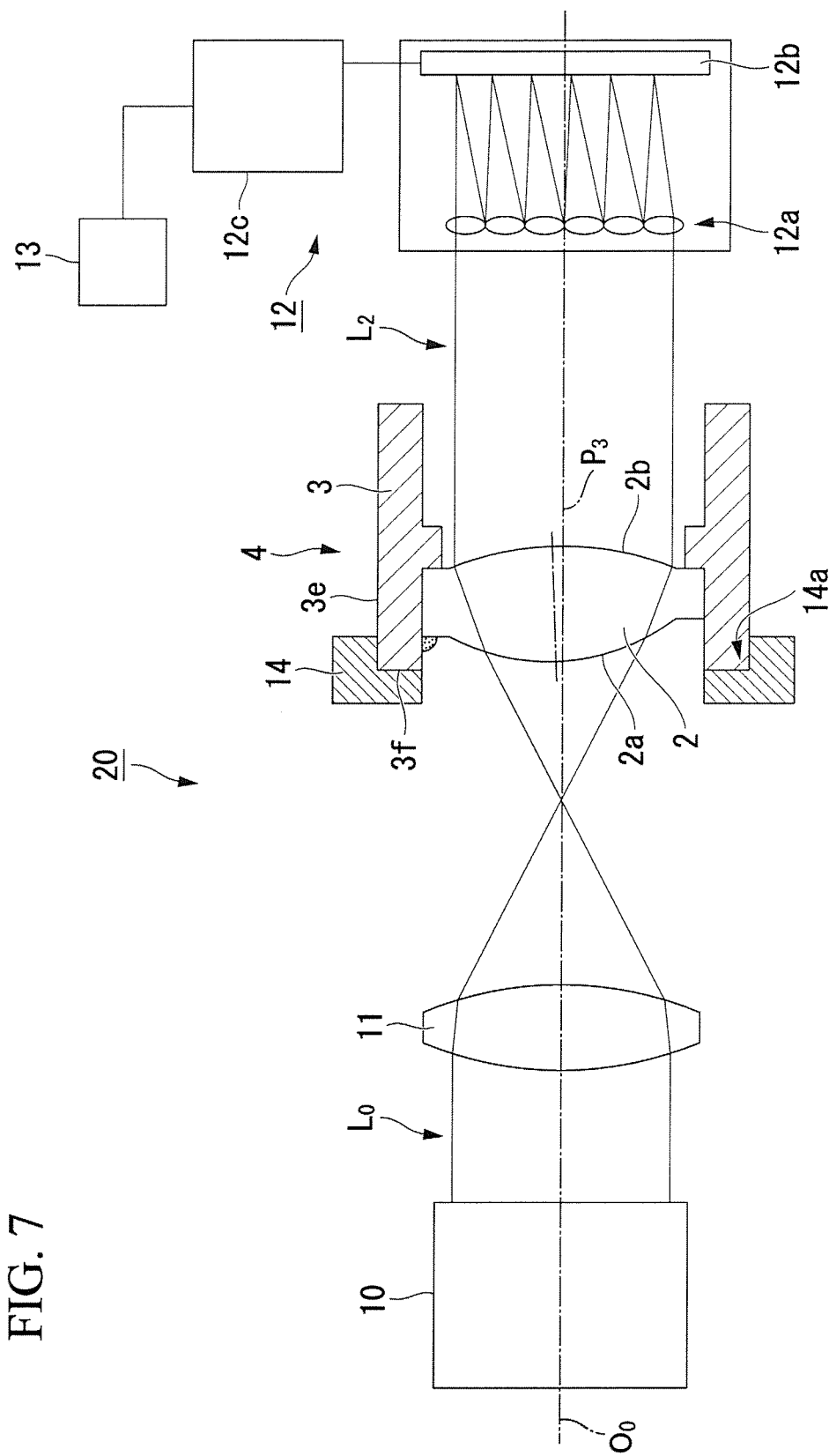
FIG. 7 is a schematic process explanatory view of an optical property-measuring step in the method for producing an optical assembly of the first embodiment of the present invention.
Figure 8:
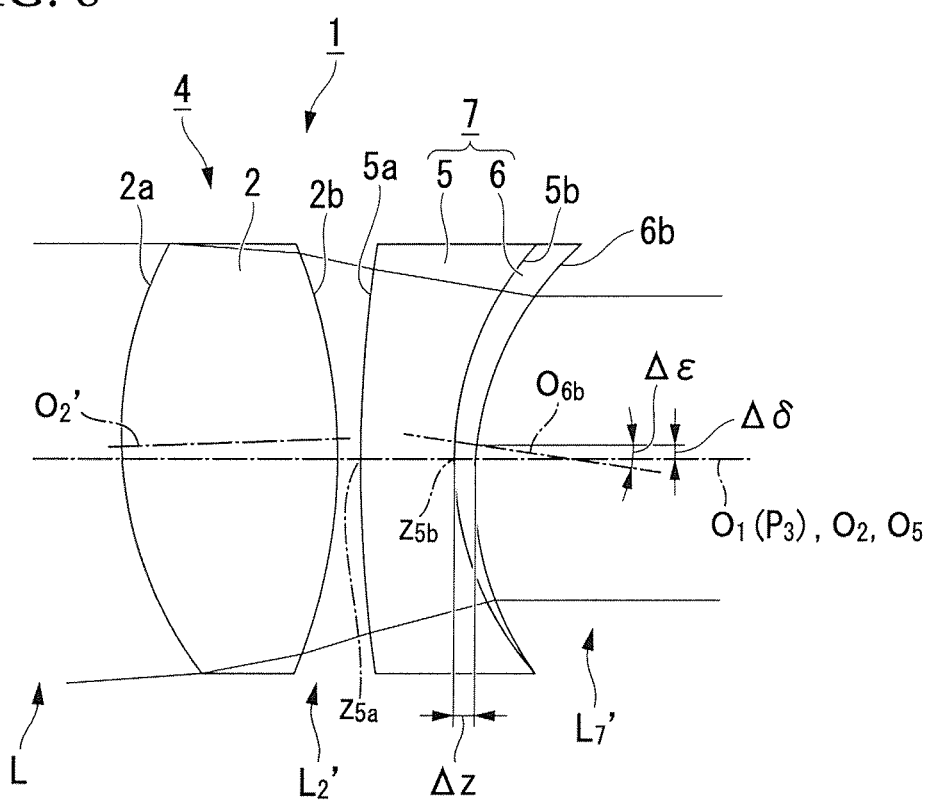
FIG. 8 is a schematic light path diagram illustrating an example of a light path of the optical assembly of the first embodiment of the present invention.
Figure 9:
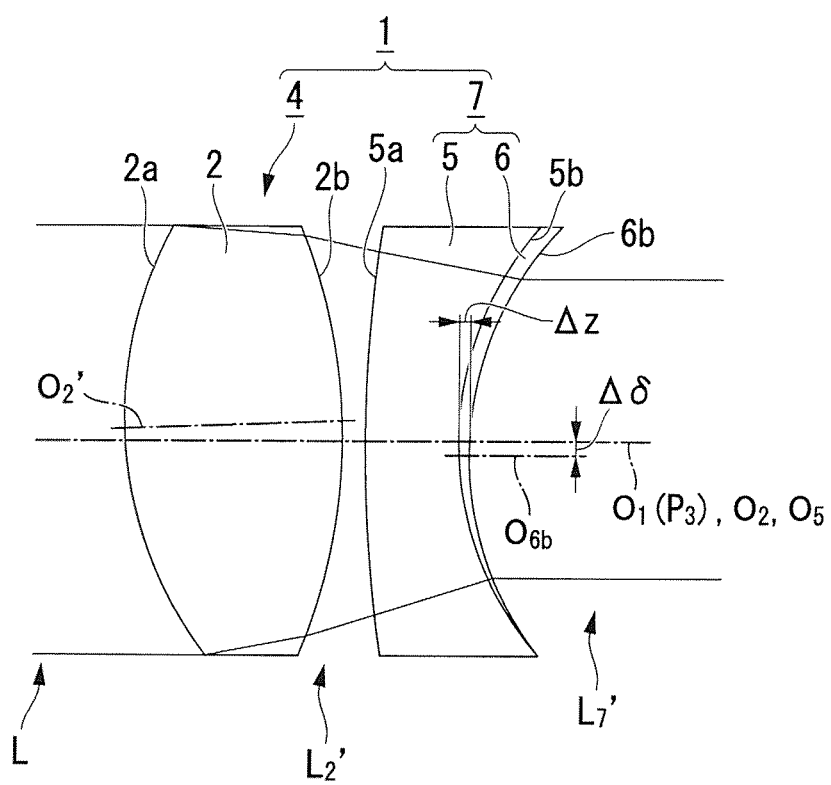
FIG. 9 is a schematic light path diagram illustrating another example of the light path of the optical assembly of the first embodiment of the present invention.
Figure 10:
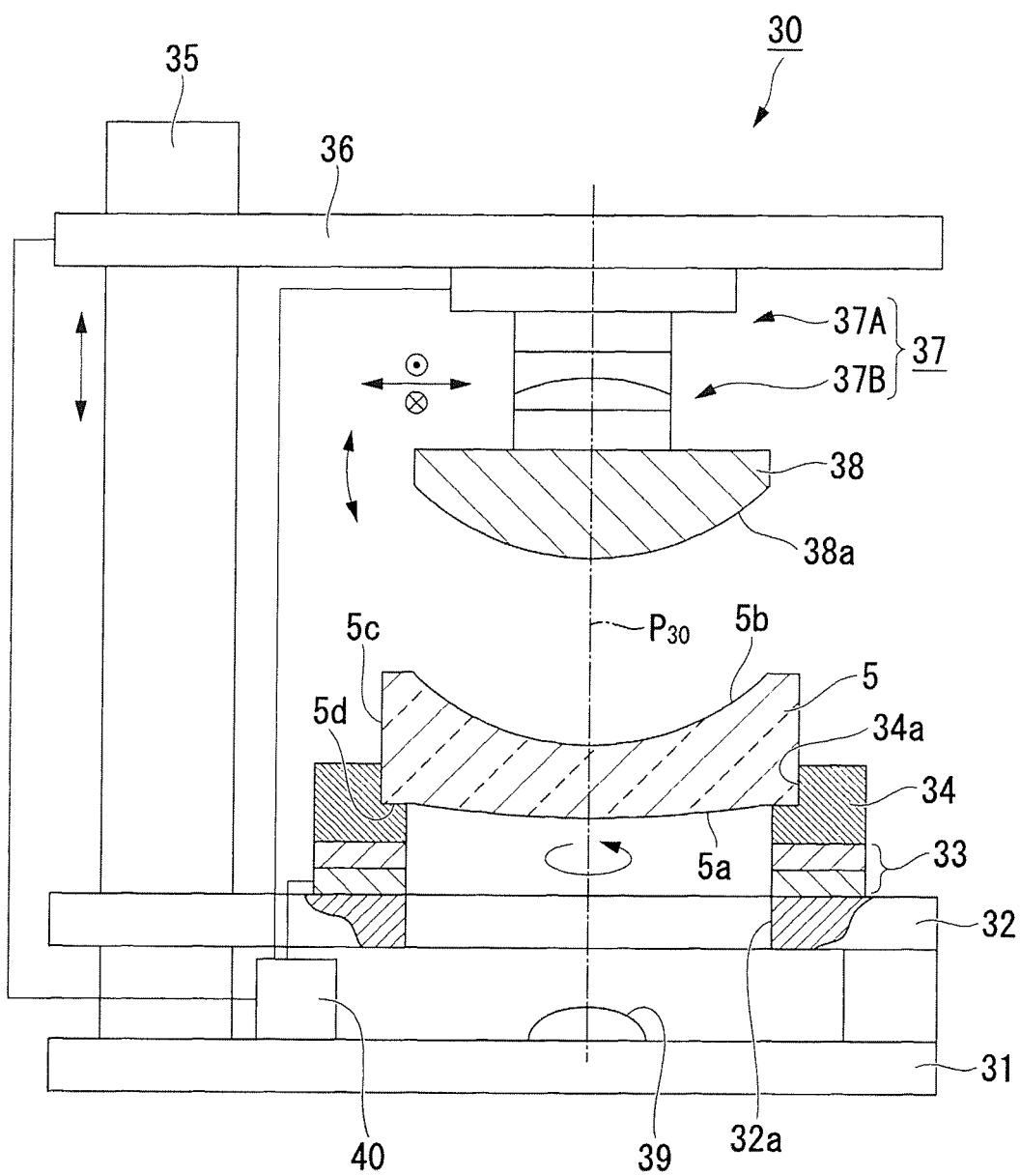
FIG. 10 is a schematic configuration view of a molding apparatus used for a lens-producing step of the method for producing an optical assembly of the first embodiment of the present invention.
Figure 11A:
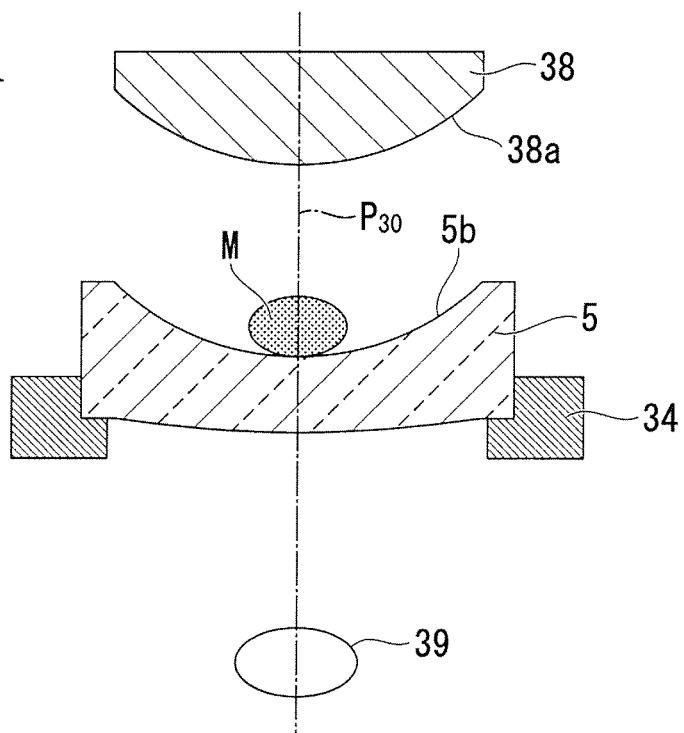
FIG. 11A is a schematic process explanatory view of the lens-producing step of the method for producing an optical assembly of the first embodiment of the present invention.
Figure 11B:
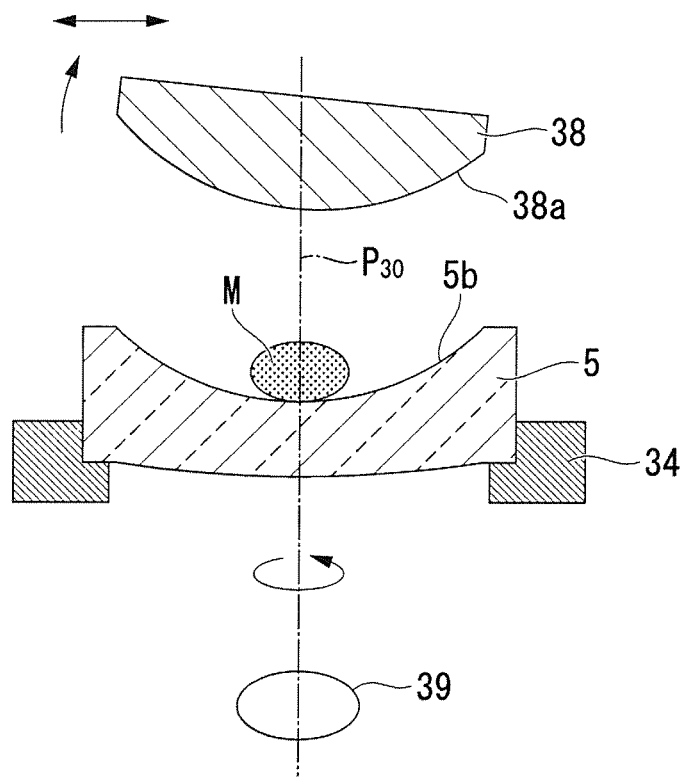
FIG. 11B is a schematic process explanatory view of the lens-producing step of the method for producing an optical assembly of the first embodiment of the present invention.
Figure 12:
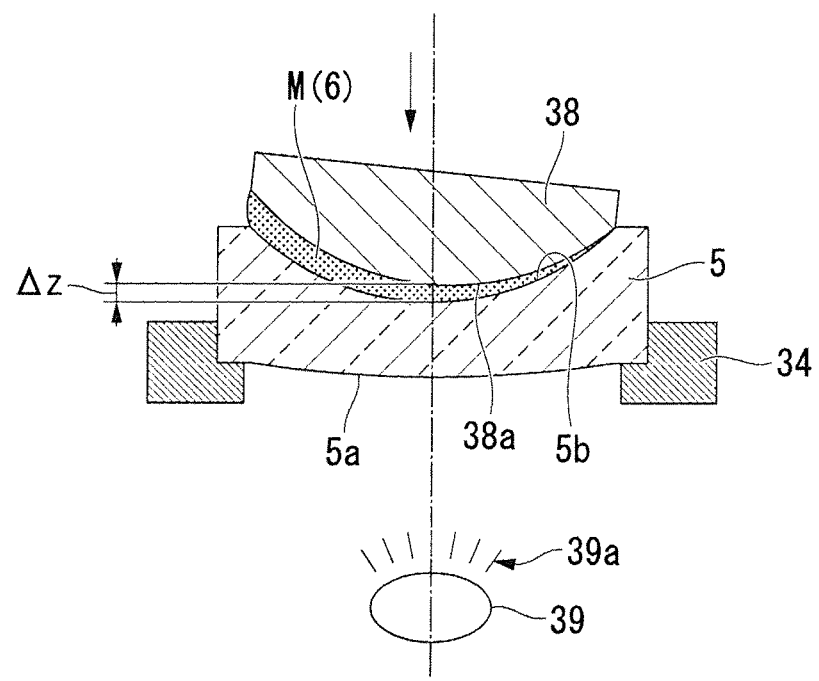
FIG. 12 is a schematic process explanatory view of the lens-producing step subsequent to FIG. 11B.

FIG. 4 is a flowchart illustrating a process flow of the method for producing an optical assembly of the first embodiment of the present invention. FIGS. 5A and 5B are schematic light path diagrams illustrating an example of a light path having the design values of the first optical system and the second optical system in the first embodiment of the present invention. FIGS. 6A and 6B are schematic light path diagrams illustrating a case where the first optical system in the first embodiment of the present invention includes production errors, and an example of a light path of the second optical system of a comparative example in that case. FIG. 7 is a schematic process explanatory view of an optical property-measuring step in the method for producing an optical assembly of the first embodiment of the present invention. FIG. 8 is a schematic light path diagram illustrating an example of a light path of the optical assembly of the first embodiment of the present invention. FIG. 9 is a schematic light path diagram illustrating another example of the light path of the optical assembly of the first embodiment of the present invention. FIG. 10 is a schematic configuration view of a molding apparatus used for a lens-producing step of the method for producing an optical assembly of the first embodiment of the present invention. FIGS. 11A and 11B are schematic process explanatory views of the lens-producing step of the method for producing an optical assembly of the first embodiment of the present invention. FIG. 12 is a schematic process explanatory view of the lens-producing step subsequent to FIG. 11B.

The method for producing the optical unit 1, as shown in FIG. 4, includes a first assembling step S1, an optical property-measuring step S2, an optical parameter correction value-calculating step S3, a lens-producing step S4, and a second assembling step S5, and performs these steps in this order.

The first assembling step S1 is a step of assembling the small assembly 4.

In the present step, as shown FIG. 2, first, the first lens 2 is inserted into the first lens radial holding surface 3b from the second lens surface 2b side, and the axial reference surface 2d of the first lens 2 and the first lens axial holding surface 3a are made to abut against each other. In this case, positional adjustment of the first lens 2 may not be performed after the insertion.

Next, the bonding portion 8 is formed by dropping and curing an adhesive at the corner portion configured of the outer peripheral portion of the planar portion 2e of the first lens 2 and the first lens radial holding surfaces 3b, and the first lens 2 is fixed to the lens holding frame 3.

With the above, the small assembly 4 is assembled and the first assembling step S1 is completed.

Next, the optical property-measuring step S2 is performed. The present step is a step of measuring the optical properties of the first optical system in the small assembly 4.

In the present embodiment, the first lens radial holding surface 3b and the second lens radial holding surface 3c of the lens holding frame 3 are provided coaxially with the central axis P3 of the lens holding frame 3, and the reference axis O1 (reference axis of the entire optical system) in terms of the lens design of the entire optical system in the optical unit 1 coincides with the central axis P3.

For example, when there are no production errors and also no assembly errors in the first lens 2, in the entire optical system, the second lens in the ideal state in terms of lens design is the original lens 5 in the present embodiment. For this reason, a ray that passes through the first lens 2 and the original lens 5 advances along an ideal light path obtained by ray tracing, and wave aberration is given according to the design value of the lens design.

For example, as shown in FIG. 5A, if a parallel beam L enters the first beam along the reference axis O1, in the small assembly 4, the parallel beam L is refracted by the first lens surface 2a and the second lens surface 2b, is emitted as a beam L2 that is a condensed beam, and advances on the reference axis O1.

Additionally, as shown in FIG. 5B, when the original lens 5 is further assembled to the small assembly 4, the beam L2 is refracted and radiated by the first lens surface 5a and the second lens surface 5b, is emitted as a beam L5 that exhibits the optical properties of the second optical system, and advances on the reference axis O1.

However, in practice, eccentricity or the like may occur in the first lens 2 due to production errors.

Additionally, in the first assembling step S1, the position and orientation of the first lens 2 may deviate from a position and a orientation in terms of design within a range of a gap between the radial reference surface 2c and the second lens radial holding surface 3c, and assembling eccentricity may occur.

For example, as shown in FIG. 6A, if a certain eccentricity occurs with respect to the reference axis O1, and positional deviation and tilt deviation of the optical axis O2' of the first lens 2 with respect the reference axis O1 are caused, the parallel beam L has wave aberration according to the amount of eccentricity if being emitted from the first lens 2, and a beam L2' that advances obliquely along the optical axis O2' is formed.

If the original lens 5 is assembled to the small assembly 4 in this state, even when there are neither production errors nor assembly errors in the original lens 5, as shown in FIG. 6B, a beam L5' emitted from the original lens 5 is skewed, and advances as the beam L5' accompanied by wave aberration according to the eccentricity of the first lens 2.

For this reason, optical properties in a predetermined image surface are inferior to design values.

In the present step, the optical properties of the first optical system are measured. The optical properties of the first optical system to be measured are not particularly limited if these optical properties are optical properties with which the optical properties of the second optical system can be precisely estimated.

For example, measurement in which a plurality of point light sources of which the light source positions are specified or an inspection pattern of which the shape and the position are specified can be arranged on an object side of the first lens 2 and point image distribution or an inspection pattern image of the point light sources or the inspection pattern is obtained on an image side can be exemplified. According to such measurement, it is possible to calculate deviation from designed point image distribution or a designed inspection pattern image of an acquired image, thereby estimating shape errors or arrangement errors, such as the eccentricity of the first optical system when the optical properties of the first optical system are changed from changes in optical properties.

Additionally, it is also considered that the wave aberration of a transmission wavefront of the first lens 2 is measured using, for example, an interferometer or the like.

In the present embodiment, a case where measurement is performed with a measuring device 20 using a Shack Hartman sensor 12 as shown in FIG. 7 will be described as an example.

The measuring device 20 includes a light source unit 10, a wavefront conversion lens 11, a subject holding portion 14, the Shack Hartman sensor 12, and a correction value analysis device 13.

The light source unit 10 generates a reference beam L0 having a uniform wavefront in order to perform inspection.

The wavefront conversion lens 11 is a lens for converting the wavefront of the reference beam L0 according to the type of the first lens 2. In the present embodiment, the wavefront conversion lens has positive refractive power and is arranged coaxially with an optical axis O0 of the reference beam L0. In addition, since FIG. 7 is a schematic view, the wavefront conversion lens 11 is shown like a single lens. However, the wavefront conversion lens may be configured of two or more lenses.

Accordingly, it is possible to form a spherical wave that condenses light at a focal position of the first lens 2 from the reference beam L0 so that the transmission wavefront of the first lens 2 forms a plane wave.

The subject holding portion 14 holds the optical unit radial reference surface 3e and the optical unit axial reference surface 3f of the lens holding frame 3 of the small assembly 4, respectively, and positions the small assembly 4 in a direction along the optical axis O0 and in a direction orthogonal to the optical axis O0, with respect to a condensing position of the wavefront conversion lens 11.

In the present embodiment, the central axis P3 of the lens holding frame 3 becomes coaxial with the optical axis O0, and the designed focal position of the first lens 2 held by the lens holding frame 3 is determined so as to coincide with the condensing position of the wavefront conversion lens 11.

The Shack Hartman sensor 12 is a wavefront sensor including a micro lens array 12a, an imaging element 12b, and an analysis computing unit 12c.

The Shack Hartman sensor 12 is electrically connected to the correction value analysis device 13 that performs the optical parameter correction value-calculating step S3 to be described below.

The Shack Hartman sensor 12 images a condensed spot of a beam, which has entered the micro lens array 12a, with the imaging element 12b, and the analysis computing unit 12c analyzes condensing positions of respective condensed spots using this image data and performs wavefront analysis.

In the analysis computing unit 12c, first, differences from ideal condensing positions of respective condensed spots when an ideal wavefront has entered the micro lens array 12a of the Shack Hartman sensor 12 are obtained from the condensing positions of the respective condensed spots sent out from the Shack Hartman sensor 12.

Next, these differences are analyzed using the Zernike polynomial, the Zernike coefficient and the Seidel aberration calculated from the Zernike coefficient are calculated, and the respective values are sent out to the correction value analysis device 13.

In the optical property-measuring step S2 performed using the measuring device 20, the subject holding portion 14 is made to hold the small assembly 4, and the reference beam L0 from the light source unit 10 is made to enter the first lens 2 as a spherical wave of which the wave aberration is favorably corrected via the wavefront conversion lens 11.

The reference beam L0 is refracted by the first lens surface 2a and the second lens surface 2b, and is emitted as a measuring beam L2 including wave aberration generated according to the production errors and arrangement errors of the first lens 2.

The measuring beam L2 that has entered the Shack Hartman sensor 12 is divided into a condensed beam by the micro lens array 12a, and is condensed on the imaging element 12b, and the image data of the imaging element 12b is sent out to the analysis computing unit 12c in real time for every constant sampling time.

In the analysis computing unit 12c, the wavefront analysis as described above is performed based on the sent-out image data, and the calculated Zernike coefficient and Seidel aberration are sent out to the correction value analysis device 13 together with identification information, such as the serial number of the small assembly 4 as a measurement object that is separately input through an input unit (not shown).

With the above, the optical property-measuring step S2 is completed.

Next, the optical parameter correction value-calculating step S3 is performed. The present step is a step of obtaining the displacement amounts from the design values of the optical properties of the first optical system based on the measurement results of the optical properties and changing the optical parameters of the second lens itself from the design values of the second lens, thereby calculating the correction values of the optical parameters of the second lens for correcting the displacement amounts.

The present step is performed using the correction value analysis device 13, in the present embodiment.

The device configuration of the correction value analysis device 13 includes a computer including a CPU, a memory, an input/output interface, an external storage, or the like, and a program that performs computation processing to be described below can be executed by this computer.

The Zernike coefficient and the Seidel aberration that are sent out from the Shack Hartman sensor 12 mean that the shape errors or the arrangement errors have occurred in the first lens 2. Additionally, if the optical parameters of the second lens are corrected so as to cancel the Zernike coefficient, it is possible to suppress aberration generation.

For example, in the case of the small assembly 4 in which the first lens 2 has tilt eccentricity in a counterclockwise direction as shown in FIG. 6A, a lens for assembly that has a correction function to offset the tilt eccentricity of the first lens 2 may be arranged instead of the original lens 5 so that the beam L2' to be skewed advances along the reference axis O1. Here, the "offset" means being suppressed to a preset allowable value or less.

In the lens for assembly having such a correction function, the displacement amounts from the design values of the optical parameters of the first optical system can be estimated from the measurement results of the optical properties of the first optical system, and the conditions of the optical parameters for offsetting the displacement amounts can be obtained by optical simulation software.

In the present embodiment, the second lens 7 in which the second lens surface 5b of the original lens 5 is provided with the additional lens portion 6 is used as such a lens for assembly.

For this reason, the correction value analysis device 13 calculates the arrangement position and the arrangement orientation of the third lens surface 6b of the second lens 7 that offsets the aberration based on the Zernike coefficient and the Seidel aberration that are sent out from the Shack Hartman sensor 12.

In the present embodiment, the relationship between the Zernike coefficient regarding the aberration in the first optical system and the arrangement position and the arrangement orientation of the third lens surface 6b for offsetting this aberration in the second optical system is obtained in advance by performing optical simulation, and this result is stored, for example in the form of a conversion expression, a database, or the like in the correction value analysis device 13.

In the present embodiment, since the second lens surface 5b of the original lens 5 is replaced with the third lens surface 6b created by the additional lens portion 6, the arrangement position or the arrangement position and the arrangement orientation of the third lens surface 6b can be changed from the arrangement position or arrangement orientation of the second lens surface 5b. Accordingly, for example the comatic aberration and astigmatism that are rotational asymmetrical components of the aberration can be generated in the second lens 7 itself. For this reason, it is possible to appropriately set the arrangement position and the arrangement orientation of the third lens surface 6b, thereby offsetting the comatic aberration and astigmatism generated in the first optical system of the small assembly 4.

For example, since the comatic aberration of the first optical system is expressed by the Zernike coefficients Z7 and Z8, in order to make the Zernike coefficients Z7 and Z8 in the transmission wavefront of the second optical system small, the arrangement position and the arrangement orientation of the third lens surface 6b of the second lens 7 only has to be obtained by the optical simulation in advance.

Additionally, the spherical aberration can be corrected in a direction capable of coping with a change in the thickness of the additional lens portion 6.

In this way, if the arrangement position and the arrangement orientation of the third lens surface 6b for correcting the displacement amount from the design value of the wave aberration of the beam L5' (refer to FIG. 6B) that is transmitted when the original lens 5 is arranged in the ideal state on the small assembly 4 are calculated, the correction value analysis device 13 sends out the calculation results to the additional lens portion processing device 30 to be described below through a communication line together with the identification information of the small assembly 4. In this case, the calculation results may be output to, for example, display means, such as a display unit (not shown) or a printer, so that an operator of the correction value analysis device 13 can view the results.

For example, as shown in FIG. 8, the aspheric surface as the third lens surface 6b having the same surface shape as the second lens surface 5b is eccentrically tilted in a clockwise direction and is spaced apart from the second lens surface 5b, and information on an arrangement position and an arrangement orientation that are appropriately eccentrically shifted is output.

If the original lens 5 is built in the lens holding frame 3 when the first optical system is formed and arranged according to the design values of the lens design, the original lens 5 is the second lens in terms of lens design. Therefore, the second optical system according to design values is configured. For example, if the arrangement positions of the first lens surface 5a and the second lens surface 5b in a direction along the reference axis O1 are defined as z5a and z5b, the shift amounts thereof in a direction orthogonal to the reference axis O1 are defined as δ5a and δ5b, shift directions are defined as θ5a and θ5b, the tilt amounts thereof with respect to the reference axis O1 are defined as ε5a and ε5b, and the surface spacing of the first lens surface 5a and the second lens surface 5b is defined as d5=z5b−z5a, in the present embodiment, these optical parameters are the design values of the optical parameters of the second lens in the entire optical system.

Since the entire optical system of the present embodiment is designed as a coaxial optical system, all of δ5a, δ5b, θ5a, θ5b, ε5a, and ε5b are 0.

In addition, unless otherwise mentioned, the optical parameters of the other lenses will be expressed by using the same symbols z, δ, θ, ε, and d and attaching symbol X of a corresponding lens surface (lens) as a subscript. That is, the arrangement position of a lens surface having symbol X in the direction along the reference axis O1 is designated by zX, the shift amount thereof in the direction orthogonal to the reference axis O1 is designated by δX, the shift direction thereof is designated by θX, the tilt angle thereof with respect to the reference axis O1 is designated by εX, and the spacing of a lens having symbol X is designated by dX.

The arrangement position z6b, shift amount δ6b, shift direction θ6b, and tilt amount ε6b of the third lens surface 6b and the spacing d7 of the second lens 7 are calculated as in the following Expressions (1) to (5) by the correction value analysis device 13. In the following Expressions (1) to (5), Δz, Δδ, Δθ, and θε are the change amounts of optical parameters that are determined according to the displacement amount from the design value of the wave aberration of the first optical system.

In the present embodiment, z6b, Δ6b, θ6b, and ε6b configure correction values with respect to the optical parameters of the second design lens of the entire optical system.

$$z6b = z5b + \Delta z \quad (1)$$

$$\delta 6b = \delta 5b + \Delta \epsilon = \Delta \epsilon \quad (2)$$

$$\theta 6b = \theta 5b + \Delta \theta = \Delta \theta \quad (3)$$

$$\epsilon 6b = \epsilon 5b + \Delta \epsilon = \Delta \epsilon \quad (4)$$

$$d7 = d5 + \Delta z \quad (5)$$

When the third lens surface 6b expressed by such optical parameters is created on the second lens surface 5b, for example as shown in FIG. 8, the eccentricity of the optical axis O2' of the beam L2' is offset by the refraction action of the third lens surface 6b, and a beam L7' emitted from the additional lens portion 6 advances substantially parallel to the reference axis O1 (also including a case where the beam is parallel to the reference axis).

In addition, the correction values of the optical parameters also change depending on the displacement amounts from the design values of the first optical system or allowable values of the optical properties when the displacement amounts are offset. For example, in order to correct an asymmetric component in the wave aberration, it is effective to change at least one of the tilt amount ε6b and the shift amount δ6b of the third lens surface 6b.

For this reason, depending on the magnitude of the eccentricity of the first optical system, as shown in FIG. 9, it is also possible to set Δε to 0 and to perform correction through the combination of Δδ and Δz. Additionally, although illustration is omitted, it is also possible to set Δδ to 0 and to perform correction through the combination of Δε and Δz.

Additionally, when the aberration of the first optical system is equal to or less than an allowable value and it determined that it not necessary to add the additional lens portion 6, information on the additional lens portion 6 not being formed is output.

In the present embodiment, when the additional lens portion 6 is formed, information on the arrangement position and the arrangement orientation of the third lens surface 6b that is the processing information of the additional lens portion 6 is sent out to the additional lens portion processing device 30 to be described below through a communication line.

In this case, it is sufficient if the processing information to be sent out is information such that the third lens surface 6b based on the above Expressions (1) to (5) can be formed. For example, the information of the arrangement position z6b can be sent out as information converted into the dimension from the axial reference surface 5d in the original lens 5. Additionally, the numerical information of z6a, δ6a, θ6a, ε6a, and d7 in a coordinate system of the entire optical system is information converted into the numerical information of a coordinate system peculiar to the additional lens portion processing device 30 equivalent to the numerical information of the entire optical system. With the above, the optical parameter correction value-calculating step S3 is completed.

Next, the lens-producing step S4 is performed. The present step is a step of producing the second lens 7 based on the correction values of the optical parameters calculated in the optical parameter correction value-calculating step S3.

In the present embodiment, the second lens 7 is produced by forming the original lens 5 with the additional lens portion 6.

Here, in the present embodiment, when the additional lens portion 6 may not be formed, the following steps are not performed, and in the second assembling step to be described below, assembly is performed using the original lens 5 instead of the second lens 7.

First, the additional lens portion processing device 30 that produces the second lens 7 will be described.

As shown in FIG. 10, in the additional lens portion processing device 30, a lens holding portion 34 that holds the original lens 5 via a rotary stage 33 that is rotatable around a reference axis P30 along a vertical axis is installed at a supporting base 32 fixed on a base 31.

The lens holding portion 34 includes a positioning portion 34a that receives the axial reference surface 5d of the original lens 5 on a lower side to support the radial reference surface 5c from a side. Accordingly, the original lens 5 is held in a orientation where the second lens surface 5b is directed upward so that the optical axis O5 thereof becomes coaxial with the reference axis P30.

The lens holding portion 34 and the rotary stage 33 have openings provided at central portions thereof so that light can be radiated into a lens effective region of the original lens 5 from below, and are arranged coaxially with a central axis of an opening 32a that penetrates the supporting base 32 in a vertical direction.

A UV light source 39 that radiates UV light is arranged on the base 31 below the opening 32a.

Additionally, a strut portion 35 that supports a linear motion stage 36 that is movable in a direction along the reference axis P30 is erected on the base 31.

The molding tool unit 38 (molding tool) that molds the shape of the third lens surface 6b is arranged via a molding tool moving unit 37 at a position that faces the central portion of the lens holding portion 34, on a lower surface of the linear motion stage 36.

The molding tool moving unit 37 includes a biaxial stage 37A that moves the molding tool unit 38 in biaxial directions orthogonal to the vertical axis, and a tilting stage 37B that tilts the molding tool unit 38 in one direction with respect to the vertical axis.

The rotary stage 33, the linear motion stage 36, and the molding tool moving unit 37 are electrically connected to a controller 40 that controls respective operations.

The controller 40 is communicably connected to the correction value analysis device 13 with a wiring line (not shown), and is adapted to be able to receive the correction values of the optical parameters calculated by the correction value analysis device 13.

By virtue of such a configuration, a molding surface 38a of the molding tool unit 38 is relatively movable in the direction along the reference axis P30 of the device, and is relatively movable in the biaxial directions that are orthogonal to each other and are orthogonal to the reference axis P30, respectively. Additionally, it is possible to drive the tilting stage 37B to thereby relatively tilt the tilting stage in arbitrary directions with respect to the optical axis O5 of the second lens surface 5b, while rotating the original lens 5 held by the lens holding portion 34 with the rotary stage 33.

In order to produce the second lens 7 with the additional lens portion processing device 30, as shown in FIG. 11A, the lens holding portion 34 is made to align and hold the original lens 5. In this case, for example, marking is performed on the radial reference surface 5c or the like so that the relative position of the original lens 5 when being held with respect to the reference position of the positioning portion 34a (not shown) can be specified.

Next, a molding material M that is required to mold the additional lens portion 6 is dropped or applied on the second lens surface 5b. As the molding material M, ultraviolet curable resin having the same refractive index as the glass material of the original lens 5 is adopted as an example.

Next, the controller 40, as shown in FIG. 11B, drives the molding tool moving unit 37 and the rotary stage 33 based on the correction values of the optical parameters sent out from the correction value analysis device 13, and makes the shift amount, shift direction, and tilt amount of the molding tool unit 38 with respect to the second lens surface 5b coincide with shift amount δ6b, shift direction θ6b, and tilt amount ε6b of the third lens surface 6b, respectively.

Next, the controller 40 drives the linear motion stage 36, to move the molding tool unit 38 along the reference axis P30 so that the spacing between the molding surface 38a and the second lens surface 5b reaches Δz that is sent out from the correction value analysis device 13 (refer to FIG. 12).

The molding material M sandwiched between the second lens surface 5b and the molding surface 38a is applied and spread without a gap toward the outer peripheral portion of the second lens surface 5b with the movement of such a molding tool unit 38, and a layered portion of the molding material M is formed between the second lens surface 5b and the molding surface 38a.

In this state, the UV light source 39 is turned on to radiate UV light 39a toward the original lens 5.

The radiated UV light 39a is transmitted through the first lens surface 5a and the second lens surface 5b and is radiated to the molding material M. Accordingly, the molding material M is cured and the additional lens portion 6 is formed between the second lens surface 5b and the molding surface 38a. After the molding material M is cured, the molding tool unit 38 is moved upward and removed from the additional lens portion 6. The second lens 7 is produced in this way.

With the above, the lens-producing step S4 is completed.

Next, the second assembling step S5 is performed. The present step is a step of assembling the second lens 7 produced in the lens-producing step S4 to the small assembly 4.

In the present embodiment, as shown in FIG. 2, the first lens surface 5a of the second lens 7 is made to face the second lens surface 2b of the small assembly 4 and is inserted into the second lens radial holding surface 3c, and the axial reference surface 5d and the second lens axial holding surface 3d are made to abut against each other.

In this case, the position of the second lens 7 around the central axis P3 is determined by aligning a mark (not shown) formed in the lens holding frame 3 with a mark (not shown) formed in the original lens 5. Accordingly, the second lens 7 is assembled to the small assembly 4 in a state where the position of the second lens 7 around the reference axis P30 in the additional lens portion processing device 30 and the position of the second lens around the central axis P3 in the lens holding frame 3 coincide with each other.

In the present embodiment, since the dimensional difference between the diameter D5c of the radial reference surface 5c and the internal diameter d3c of the second lens radial holding surface 3c is sufficiently small, positional adjustment in the radial direction after the insertion is unnecessary. If the second lens 7 is inserted in this way, an adhesive is applied on the corner portion configured of the planar portion 5e and the second lens radial holding surface 3c, and is cured to form the bonding portion 9.

Accordingly, as shown in FIGS. 1A and 1B, the second lens 7 is fixed to the small assembly 4, and the optical unit 1 is assembled.

With the above, the second assembling step S5 is completed.

Here, the first assembling step S1, the optical property-measuring step S2, and the optical parameter correction value-calculating step S3 of the present embodiment configure the method for designing a lens for assembly of the present embodiment.

In the optical unit 1 assembled in this way, since the second lens 7 is obtained by forming the original lens 5 with the additional lens portion 6 based on the measurement results of the optical properties of the small assembly 4, degradation of the optical properties of the first optical system based on the displacement amounts from the design values of the optical parameters is corrected. For this reason, for example, as shown in FIG. 8, even when tilt deviation occurs in the optical axis O2' of the first lens 2, the wave aberration of the beam L7' transmitted through the second lens 7 is corrected.

In this way, according to the producing method of the present embodiment, excellent optical properties can be obtained by simple work without adjusting an assembling position.

Since the optical properties required to form the additional lens portion 6 are measured by performing the wavefront measurement using the Shack Hartman sensor 12, the optical properties can be very rapidly measured.

Additionally, since the additional lens portion 6 is formed by the additional lens portion processing device 30 provided separately from the measuring device 20, measurement only has to be performed by changing the small assembly 4, and the measurement work can be efficiently performed in the measuring device 20.

For this reason, productivity can be improved by performing the optical property-measuring step S2, the optical parameter correction value-calculating step S3, and the lens-producing step S4 in parallel with respect to the small assembly 4 and second lens 7 that are different from each other.

First Modification Example

Next, a first modified example of the present embodiment will be described.

Figure 13A:
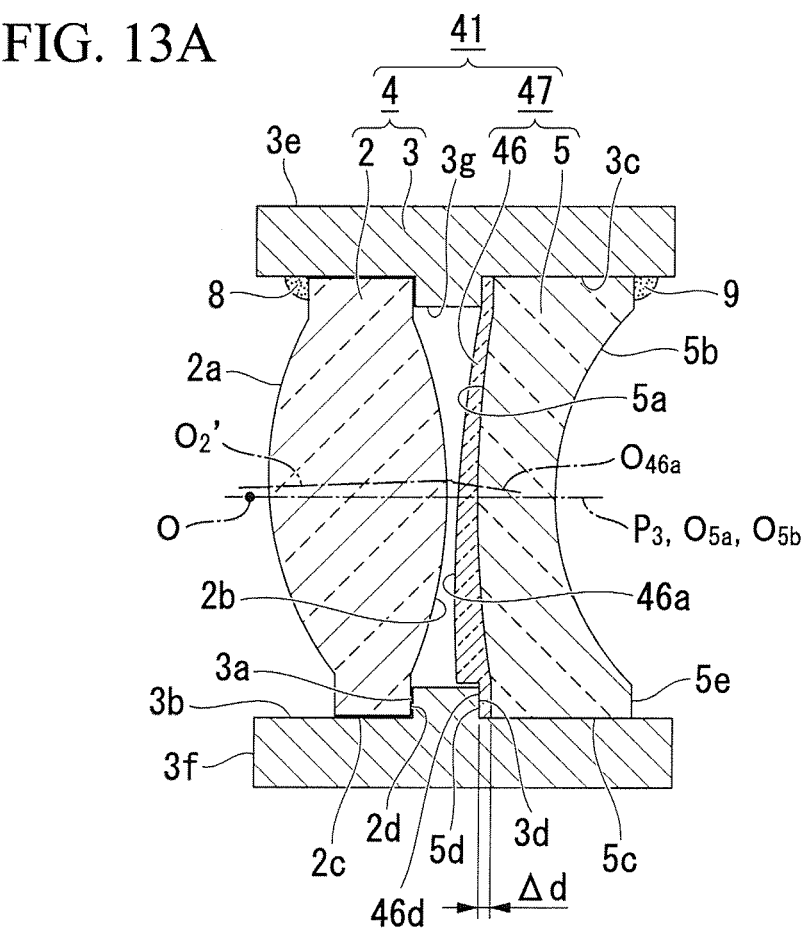
FIG. 13A is a cross-sectional view illustrating an example of an optical assembly that is assembled by a method for producing an optical assembly of a first modification example of the first embodiment of the present invention.
Figure 13B:
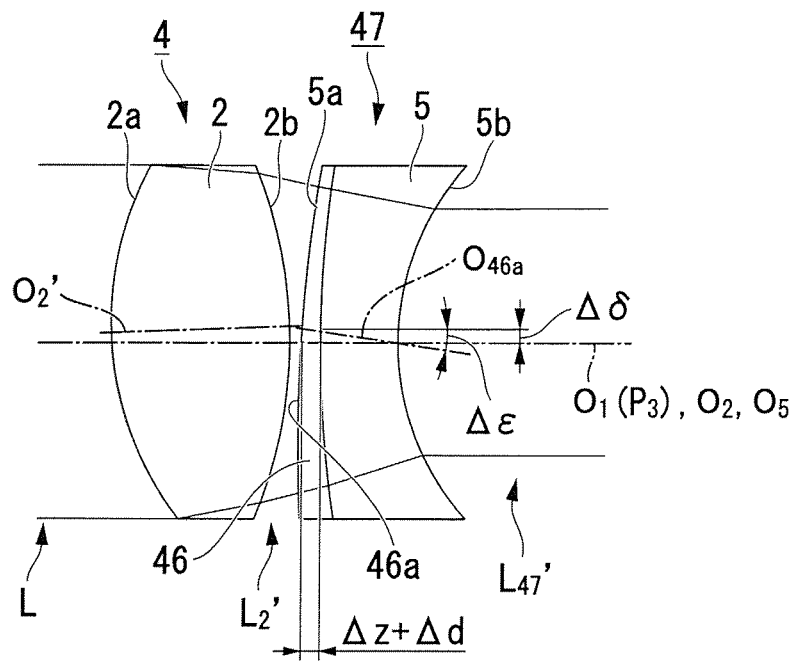
FIG. 13B is a schematic light path diagram of FIG. 13A.

FIG. 13A is a cross-sectional view illustrating an example of an optical assembly that is assembled by a method for producing an optical assembly of a first modification example of the first embodiment of the present invention. FIG. 13B is a schematic light path diagram of the optical assembly of the first modification example.

As shown in FIG. 13A, an optical unit 41 (optical assembly) produced by the method for producing an optical assembly of the present modification example includes a second lens 47 (an n-th lens or a lens for assembly) instead of the second lens 7 of the above first embodiment.

In the second lens 47, the additional lens portion 6 of the second lens 7 of the above first embodiment is eliminated and an additional lens portion 46 (adding portion) is added.

Hereinafter, differences from the above first embodiment will mainly be described.

The additional lens portion 46 is a shape portion to which a light-transmissive material is added in close contact on the first lens surface 5a and the axial reference surface 5d of the original lens 5 in order to correct the displacement amounts from the design values of the optical properties of the first optical system resulting from the production errors and assembly errors of the first lens 2 in the small assembly 4.

The surface of the additional lens portion 46 is formed with a third lens surface 46a that has the same surface shape as the first lens surface 5a and is formed at a position apart from the first lens surface 5a, and an axial positioning portion 46d that is provided to protrude from the axial reference surface 5d, at a position that overlaps the axial reference surface 5d in an outer peripheral portion of the third lens surface 46a.

In the present modification example, the axial positioning portion 46d is provided in a shape such that the axial reference surface 5d is separated by a constant distance along the central axis P3 from the second lens axial holding surface 3d of the lens holding frame 3.

Accordingly, the axial positioning portion 46d may be formed in the shape of a layer with a certain thickness that covers the whole axial reference surface 5d, or may be formed as a plurality of projections that protrudes by a certain height from a portion of the axial reference surface 5d.

The arrangement position and orientation of the first lens surface 5a with respect to the third lens surface 46a and the protruding amount of the axial positioning portion 46d from the axial reference surface 5d are determined similar to the above first embodiment according to the displacement amounts from the design values of the optical properties of the first optical system.

In the example shown in FIGS. 13A and 13B, since optical axis O2' of the first lens 2 tilts within an shown sheet plane with respect to the ideal state, the third lens surface 46a is formed in a orientation where an optical axis O46a thereof has inclined in a direction opposite to the optical axis O2' with respect to the optical axis O5a.

According to the present modification example, since the additional lens portion 46 has the axial positioning portion 46d, it is possible to increase the spacing between the second lens surface 2b of the first lens 2 and the first lens surface 5a of the original lens 5. For example, when the protruding amount of the third lens surface 46a of the additional lens portion 46 becomes greater than the spacing between the second lens surface 2b and the first lens surface 5a in terms of the design of the entire optical system as a result of the fact that the tilt amount and shift amount of the third lens surface 46a become large, interference with the third lens surface 46a and the second lens surface 2b can be avoided by adjusting the protruding amount of the axial positioning portion 46d from the first lens surface 5a.

Such an additional lens portion 46 can be added, for example, by applying a light-transmissive curable resin material on the first lens surface 5a and the axial reference surface 5d to perform molding using a molding tool that transfers the shape of the third lens surface 46a.

The refractive index and Abbe number when a resin material that forms the additional lens portion 46 is cured may be the same as or may be different from the refractive index and Abbe number of the original lens 5.

In the following, a case where the refractive index and Abbe number of the additional lens portion 46 are the same as those of the original lens 5 will be described as an example. In this case, refraction does not occur in the first lens surface 5a that is a border surface with the additional lens portion 46. For this reason, the second lens 47 is a meniscus lens in which a first surface is configured of the third lens surface 46a that is eccentric with respect to the optical axis O5a of the first lens surface 5a and the second surface is configured of the second lens surface 5b.

The optical unit 41 having such a configuration can be produced by performing the first assembling step S1, the optical property-measuring step S2, the optical parameter correction value-calculating step S3, the lens-producing step S4, and the second assembling step S5 in this order, substantially similar to the above first embodiment.

In addition, since the first assembling step S1 and the optical property-measuring step S2 of the present modification example are exactly the same steps as the steps in the above first embodiment, the description thereof is omitted.

The optical parameter correction value-calculating step S3 of the present modification example is different from that of the above first embodiment in that the correction values of the optical parameters calculated by the correction value analysis device 13 in order to offset the aberration in the first optical system are mainly the arrangement position or the arrangement position and the arrangement orientation of the third lens surface 46a to be created by the additional lens portion 46.

By providing the third lens surface 46a, for example, the comatic aberration and astigmatism that are rotational asymmetrical components of the aberration can be generated in the second lens 47 itself. For this reason, it is possible to appropriately set the arrangement position and the arrangement orientation of the third lens surface 46a, thereby offsetting the comatic aberration and astigmatism generated in the first optical system of the small assembly 4.

Here, in the present modification example, since the additional lens portion 46 has the axial positioning portion 46d, the arrangement position of the second lens surface 5b along the central axis P3 also changes.

For this reason, the correction value analysis device 13 changes the arrangement position or the arrangement position and the arrangement orientation of the third lens surface

46a, and changes the protruding amount of the axial positioning portion 46d, that is, the arrangement position of the second lens surface 5b on the central axis P3 so that the third lens surface 46a does not interfere with the second lens surface 2b, thereby performing computation that achieves optimization of aberration correction.

In this way, if the arrangement position and the arrangement orientation of the third lens surface 46a and the protruding amount of the axial positioning portion 46d for correcting the displacement amount from the design value of the wave aberration of the beam L5' (refer to FIG. 6B) that is transmitted when the original lens 5 is arranged in the ideal state on the small assembly 4 are calculated, the correction value analysis device 13 sends out the calculation results to the additional lens portion processing device 30 through a communication line together with the identification information of the small assembly 4, similar to the above first embodiment.

For example, as shown in FIG. 13B, the aspheric surface as the third lens surface 46a having the same surface shape as the second lens surface 5b is eccentrically tilted in the clockwise direction and is appropriately spaced apart from the second lens surface 2b and the first lens surface 5a, and an arrangement position and an arrangement orientation that are appropriately eccentrically shifted are output.

For example, information regarding z46a, δ46a, θ46a, ε46a, and d47 of the additional lens portion 46 as in the following Expressions (6) to (10) or the fact that the additional lens portion 46 is not formed is output as the correction values of the optical parameters of the second lens in terms of design of the entire optical system.

$$z46a = z5a - \Delta z \quad (6)$$

$$\Delta 46a = \Delta \delta \quad (7)$$

$$\theta 46a = \Delta \theta \quad (8)$$

$$\epsilon 46a = \Delta \epsilon \quad (9)$$

$$d47 = d5 + \Delta z + \Delta d \quad (10)$$

Here, Δd is the protruding amount of the axial positioning portion 46d from the axial reference surface 5d (refer to FIG. 13A).

In addition, although a positional relationship in which the third lens surface 46a protrudes further than the axial positioning portion 46d is shown in FIG. 13A, this is an example and Δz and Δd can be independently changed. For example, by satisfying Δd>Δz, it is also possible to space the third lens surface 46a apart from the second lens surface 2b further than a position in terms of lens design.

When the third lens surface 46a and the axial positioning portion 46d expressed by such optical parameters are created on the first lens surface 5a and the axial reference surface 5d, for example as shown in FIG. 13, the eccentricity of the optical axis O2' of the beam L2' is offset by the refraction action of the second lens 47, and a beam L47' emitted from the second lens surface 5b advances substantially parallel to the reference axis O1 (also including a case where the beam is parallel to the reference axis).

When the additional lens portion 46 is formed, the processing information of the additional lens portion 46 is sent out to the additional lens portion processing device 30 through a communication line, similar to the above first embodiment.

With the above, the optical parameter correction value-calculating step S3 of the present modification example is completed.

Next, the lens-producing step S4 of the present modification example is performed. The present step is different from the lens-producing step S4 of the above first embodiment in that the additional lens portion 46 is formed on the original lens 5 instead of the additional lens portion 6 to produce the second lens 47.

For this reason, although illustration is omitted, the molding surface 38a of the molding tool unit 38 of the additional lens portion processing device 30 is changed into the surface shape of the first lens surface 5a, and the lens holding portion 34 is made to hold the original lens 5 in a state where the first lens surface 5a faces the molding tool unit 38.

Accordingly, the third lens surface 46a can be formed similar to the above first embodiment.

Meanwhile, the axial positioning portion 46d can be formed simultaneously with the third lens surface 46a by providing the height-adjustable molding tool unit for forming the axial positioning portion 46d on the outer peripheral side of the molding tool unit 38.

Here, the axial positioning portion 46d may be formed by a molding step that is separate from the molding of the third lens surface 46a.

Additionally, the axial positioning portion 46d may be formed by forming a layered portion or a protruding portion with an appropriate thickness in advance through, for example molding, deposition, joining, or the like adjusting the thickness of the layered portion or the protruding portion through machining, etching, or the like.

If the third lens surface 46a and the axial positioning portion 46d are formed, the lens-producing step S4 of the present modification example is completed.

Next, the second assembling step S5 of the present modification example is performed. The present step is different from the second assembling step S5 of the above first embodiment in that the second lens 47 is assembled to the small assembly 4 instead of the second lens 7.

In the optical unit 41 assembled in this way, since the second lens 47 is obtained by forming the original lens 5 with the additional lens portion 46 based on the measurement results of the optical properties of the small assembly 4, degradation of the optical properties of the first optical system based on the displacement amount from the design value of for example, eccentricity is corrected. For this reason, similar to the above first embodiment, for example, as shown in FIG. 13B, even when tilt deviation occurs in the optical axis O2' of the first lens 2, the wave aberration of the beam L47' transmitted through the second lens 47 is corrected.

In this way, according to the producing method of the present modification example, excellent optical properties can be obtained by simple work without adjusting an assembling position.

Particularly, in the present modification example, since the arrangement position and the arrangement orientation of the third lens surface 46a adjacent to the first optical system can be changed, the wave aberration can be efficiently corrected.

Additionally, since the additional lens portion 46 is provided with the axial positioning portion 46d, even when the spacing between a last surface of the first optical system and the first surface of the second lens is narrow in terms of lens design, the third lens surface 46a can be separated from the second lens surface 2b in a state positional relationship in which these surfaces do not interfere with each other. Therefore, the change ranges of the tilt amount and shift amount of the third lens surface 46a can be widened.

Additionally, since the axial positioning portion 46d is provided, the degree of freedom in change between the spacing between the second lens surface 2b and the third lens surface 46a and the spacing between the third lens surface 46a and the second lens surface 5b change is improved.

Additionally, since the axial positioning portion 46d is provided, it is possible to change only the tilt amount or shift amount of the third lens surface 46a from a position in terms of design.

Second Modification Example

Next, a second modified example of the present embodiment will be described.

Figure 14A:
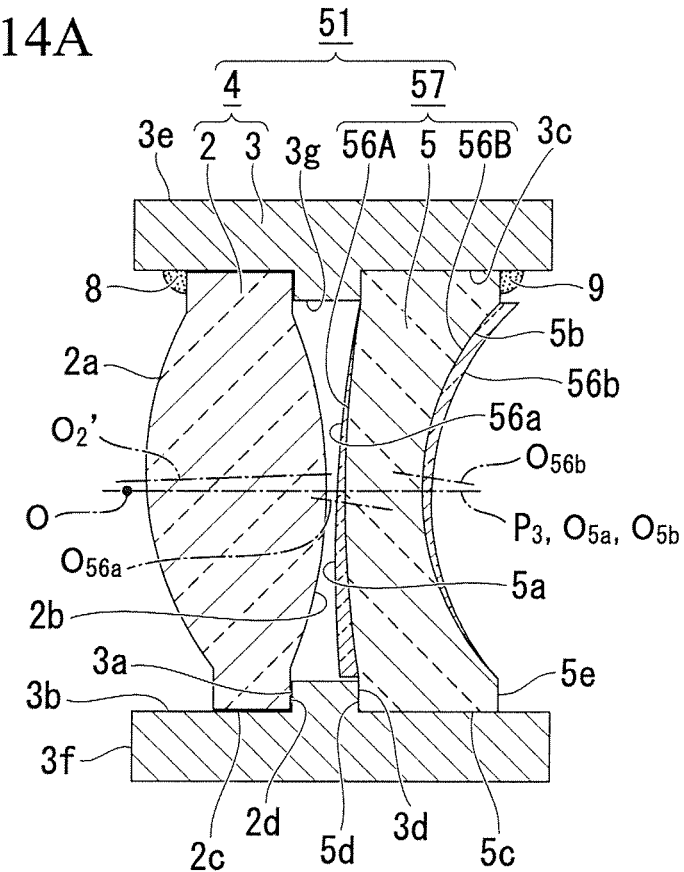
FIG. 14A is a cross-sectional view illustrating an example of an optical assembly that is assembled by a method for producing an optical assembly of a second modification example of the first embodiment of the present invention.
Figure 14B:
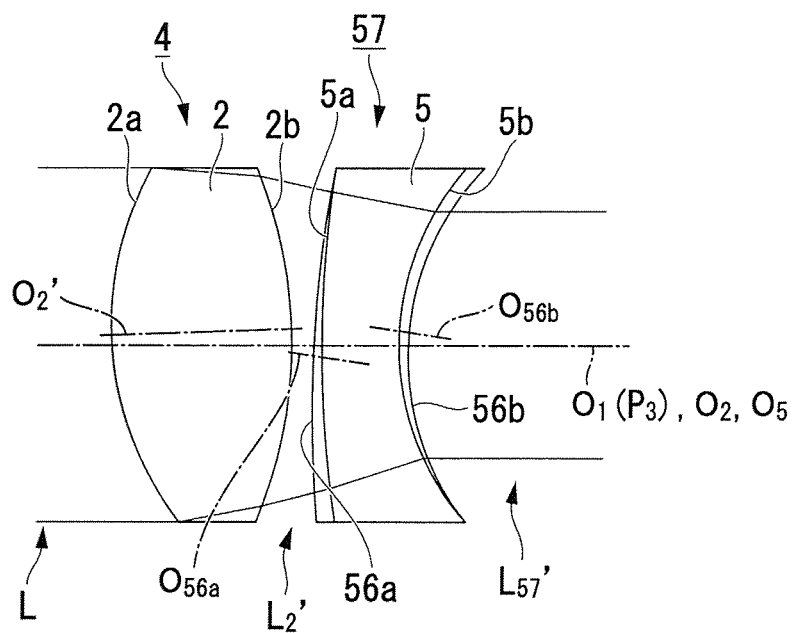
FIG. 14B is a schematic light path diagram of FIG. 14A.

FIG. 14A is a cross-sectional view illustrating an example of an optical assembly that is assembled by a method for producing an optical assembly of a second modification example of the first embodiment of the present invention. FIG. 14B is a schematic light path diagram of the optical assembly of the second modification example.

As shown in FIG. 14A, an optical unit 51 (optical assembly) produced by the method for producing an optical assembly of the present modification example includes a second lens 57 (an n-th lens or a lens for assembly) instead of the second lens 7 of the above first embodiment.

In the second lens 57, the additional lens portion 6 of the second lens 7 of the above first embodiment is eliminated and additional lens portions 56A and 56B (adding portions) are added.

Hereinafter, differences from the above first embodiment will mainly be described.

The additional lens portions 56A and 56B are shape portions to which a light-transmissive material is added in order to correct the displacement amounts from the design values of the optical properties of the first optical system resulting from the production errors and assembly errors of the first lens 2 in the small assembly 4.

The additional lens portion 56A is formed in close contact on the first lens surface 5a of the original lens 5, and the additional lens portion 56B is formed in close contact on the second lens surface 5b of the original lens 5.

A third lens surface 56a having the same surface shape as the first lens surface 5a is formed at a position apart from the first lens surface 5a, on the surface of the additional lens portion 56A.

A fourth lens surface 56b having the same surface shape as the second lens surface 5b is formed at a position apart from the second lens surface 5b, on the surface of the additional lens portion 56B.

In the present modification example, the third lens surface 56a does not advance onto the axial reference surface 5d, and the fourth lens surface 56b does not advance onto the planar portion 5e.

The arrangement position and orientation of the third lens surface 56a with respect to the first lens surface 5a and the arrangement position and orientation of the fourth lens surface 56b with respect to the second lens surface 5b are determined similar to the above first embodiment according to the displacement amounts from the design values of the optical properties of the first optical system.

In the example shown in FIGS. 14A and 14B, the optical axis O2' of the first lens 2 tilts within the shown sheet plane with respect to the ideal state. For this reason, the third lens surface 56a is formed in a orientation in which an optical axis O56a thereof has inclined in a direction opposite to the optical axis O2' with respect to the optical axis O5a. Additionally, the fourth lens surface 56b is formed in a orientation in which an optical axis O56b thereof has inclined in the direction opposite to the optical axis O2' with respect to the optical axis O5b.

Such an additional lens portion 56A (56B), similar to the above first embodiment, can be added, for example, by applying a light-transmissive curable resin material on the first lens surface 5a (second lens surface 5b) to perform molding using a molding tool that transfers the shape of the third lens surface 56a (fourth lens surface 56b).

The refractive index and Abbe number when a resin material that forms the additional lens portion 56A (56B) is cured may be the same as or may be different from the refractive index and Abbe number of the original lens 5.

In the following, a case where the refractive index and Abbe number of the additional lens portion 56A (56B) are the same as those of the original lens 5 will be described as an example. In this case, refraction does not occur in the first lens surface 5a (second lens surface 5b) that is a border surface with the additional lens portion 56A (56B). For this reason, the second lens 57 is a meniscus lens in which a first surface is configured of the third lens surface 46a that is eccentric with respect to the optical axis O5a of the first lens surface 5a and the second surface is configured of the fourth lens surface 56b that is eccentric with respect to the optical axis O5b of the second lens surface 5b.

The optical unit 51 having such a configuration can be produced by performing the first assembling step S1, the optical property-measuring step S2, the optical parameter correction value-calculating step S3, the lens-producing step S4, and the second assembling step S5 in this order, substantially similar to the above first embodiment.

In addition, since the first assembling step S1 and the optical property-measuring step S2 of the present modification example are exactly the same steps as the steps in the above first embodiment, the description thereof is omitted.

The optical parameter correction value-calculating step S3 of the present modification example is different from that of the above first embodiment in that the correction values of the optical parameters calculated by the correction value analysis device 13 in order to offset the aberration in the first optical system are mainly the arrangement position or the arrangement position and the arrangement orientation of the third lens surface 56a and the fourth lens surface 56b to be created by the additional lens portions 56A and 56B.

Namely, there is a difference in that, in the above first embodiment and first modification example, one lens surface is created on the original lens 5 to form the second lens, whereas, in the present modification example, one lens surface is created on the original lens 5 to form the second lens 57. In that case, the arrangement positions and arrangement orientations of the third lens surface 56a and the fourth lens surface 56b can be changed independently from each other.

For this reason, the correction function can be distributed to the third lens surface 56a and the fourth lens surface 56b. Therefore, the degree of freedom of the aberration correction is improved compared with the above first embodiment and first modification example. If the displacement amounts from the design values of the first optical system are the same, it is possible to perform more excellent aberration correction than the above first embodiment and first modification example. Particularly, the comatic aberration and the astigmatism are easily generated in the second lens 57 itself, and it becomes easy to offset comatic aberration and astigmatism to be generated in the first optical system of the small assembly 4.

Additionally, if the displacement amounts from the design values of the first optical system are the same, it is possible to reduce respective added thicknesses compared to the above first embodiment and first modification example.

For this reason, the correction value analysis device 13 changes the arrangement positions or the arrangement positions and arrangement orientations of the third lens surface 56a and the fourth lens surface 56b so that the displacement amount from the design value of the wave aberration of the first optical system can be offset. In that case, the arrangement of the third lens surface 56a is changed within a range where the third lens surface 56a and the second lens surface 2b do not interfere with each other, to perform computation that achieves optimization of the aberration correction.

Since the types of the correction values of the calculated optical parameters are the same (where excluding Δd) in the above first embodiment and first modification example, and only specific values vary, the description thereof is omitted.

If the arrangement positions and arrangement orientations of the third lens surface 56a and the fourth lens surface 56b are calculated in this way, the correction value analysis device 13 outputs the calculation results to a display unit or a printer (not shown).

For example, as shown in FIG. 14B, the aspheric surface as the third lens surface 56a (fourth lens surface 56b) having the same surface shape as the first lens surface 5a (second lens surface 5b) is eccentrically tilted in the clockwise direction and is appropriately spaced apart from the first lens surface 5a (second lens surface 5b), and information on an arrangement position and an arrangement orientation that are appropriately eccentrically shifted or the fact that the additional lens portions 56A and 56B are not formed is output.

When the third lens surface 56a and the fourth lens surface 56b expressed by the calculated optical parameters are created on the original lens 5, for example as shown in FIG. 14B, the eccentricity of the optical axis O2' of the beam L2' is offset by the refraction action of the second lens 57, and a beam L57' emitted from the fourth lens surface 56b advances substantially parallel to the reference axis O1 (also including a case where the beam is parallel to the reference axis).

When the additional lens portions 56A and 56B are formed, the processing information of the additional lens portions 56A and 56B is sent out to the additional lens portion processing device 30 through a communication line, similar to the above first embodiment.

With the above, the optical parameter correction value-calculating step S3 of the present modification example is completed.

Next, the lens-producing step S4 of the present modification example is performed. The present step is different from the lens-producing step S4 of the above first embodiment in that the additional lens portions 56A and 56B are formed on the original lens 5 instead of the additional lens portion 6 to produce the second lens 57.

For this reason, in the present step, a step of forming the additional lens portion 56A and a step of forming the additional lens portion 56B are performed using the additional lens portion processing device 30, similar to the above first embodiment. As for the formation order, any of the above steps may be performed first. For example, after the additional lens portion 56A is formed on the first lens surface 5a, this lens is inverted on the lens holding portion 34, the molding surface 38a of the molding tool unit 38 is changed, and the additional lens portion 56B is formed.

With the above, the lens-producing step S4 of the present modification example is completed.

Next, the second assembling step S5 of the present modification example is performed. The present step is different from the second assembling step S5 of the above first embodiment in that the second lens 57 is assembled to the small assembly 4 instead of the second lens 7.

In the optical unit 51 assembled in this way, since the second lens 57 is obtained by forming the original lens 5 with the additional lens portions 56A and 56B based on the measurement results of the optical properties of the small assembly 4, degradation of the optical properties of the first optical system based on the displacement amount from the design value of, for example, eccentricity is corrected. For this reason, similar to the above first embodiment, for example, as shown in FIG. 14B, even when tilt deviation occurs in the optical axis O2' of the first lens 2, the wave aberration of the beam L57' transmitted through the second lens 57 is corrected.

In this way, according to the producing method of the present modification example, excellent optical properties can be obtained by simple work without adjusting an assembling position.

Particularly, in the present modification example, the load of the aberration correction is distributed to the third lens surface 56a and the fourth lens surface 56b. For this reason, since the protruding amount of the third lens surface 56a can be suppressed, is possible to perform excellent aberration correction even when the spacing between the last surface of the first optical system and the first surface of the second lens is narrow in terms of lens design.

Third Modification Example

Next, a third modified example of the present embodiment will be described.

In the present modification example, the small assembly 4 and the second lens 7 are assembled to produce the optical unit 1, similar to the above first embodiment. However, as shown in FIG. 4, an optical property-measuring step S12 and an optical parameter correction value-calculating step S13 are included instead of the optical property-measuring step S2 and the optical parameter correction value-calculating step S3 of the above first embodiment.

Hereinafter, differences from the above first embodiment will mainly be described.

The optical property-measuring step S12 of the present modification example is different from that of the above first embodiment in that the optical properties of the second optical system are measured by the measuring device 20 in a state in which the original lens 5 is temporarily assembled to the small assembly 4 as a temporary assembling lens equivalent to the second lens, at an arrangement position in terms of optical design.

Although the original lens 5 may be the original lens 5 in which the additional lens portion 6 is added and actually assembled to the small assembly 4, the original lens may be a jig lens prepared for measurement.

In the temporary assembling of the original lens 5, the axial reference surface 5d of the original lens 5 is inserted into the second lens radial holding surface 3c of the lens holding frame 3, and the axial reference surface 5d is made to abut against the second lens axial holding surface 3d. The position of the original lens 5 is fixed using a suitable jig, if necessary, so that the original lens 5 does not move during measurement.

Additionally, in the present modification example, the optical system to be measured changes. Therefore, as for the wavefront conversion lens 11, the wavefront conversion lens 11 is arranged at a position where the reference beam L0 is condensed at a focal position of the second optical system configured of the small assembly 4 and the original lens 5.

The optical parameter correction value-calculating step S13 of the present modification example, similar to the above first embodiment, is a step of obtaining the displacement amounts from the design values of the optical properties of the first optical system based on the measurement results of the optical properties and changing the optical parameters of at least the second lens itself from the design values of the second lens, thereby calculating the correction values of the optical parameters of the second lens for correcting the displacement amounts.

Here, since the measurement results of the optical properties are the optical properties of the second optical system, the present modification example is different from the above first embodiment in that the computation processing of calculating the aberration of the first optical system is performed similar to the above first embodiment by removing the amount of contribution of the original lens 5 in the measurement results.

Namely, as shown in FIG. 6B, if the original lens 5 is temporarily assembled to the eccentric first lens 2, the wave aberration of a beam L5' transmitted through the original lens 5 is obtained by adding designed wave aberration based on the original lens 5 to the wave aberration of the first optical system. Therefore, it is possible to calculate the wave aberration based on the first optical system from the wave aberration of the beam L5', using optical simulation software.

Since the wave aberration of the first optical system is obtained in this way, the correction values of the optical parameters are calculated next similar to the optical parameter correction value-calculating step S3 of the above first embodiment.

According to the present modification example, only the optical property-measuring step S12 and the optical parameter correction value-calculating step S3 are different, and the assembly of the optical unit 1 can be performed similar to the above first embodiment.

The first assembling step S1, the optical property-measuring step S12, and the optical parameter correction value-calculating step S13 of the present modification example configure the method for designing a lens for assembly of the present modification example.

Fourth Modification Example

Next, a method for producing an optical assembly of a fourth modification example of the present embodiment will be described.

Figure 15:
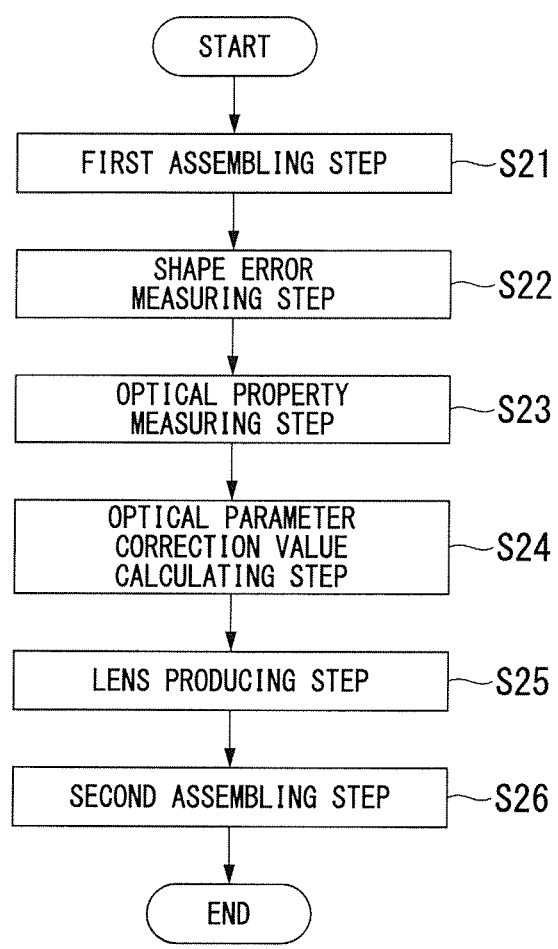
FIG. 15 is a flowchart illustrating a process flow of a method for producing an optical assembly of a fourth modification example of the first embodiment of the present invention.

FIG. 15 is a flowchart illustrating a process flow of the method for producing an optical assembly of the fourth modification example of the first embodiment of the present invention.

As for the method for producing an optical assembly of the present modification example, a case where the optical unit 1 of the above first embodiment is assembled will be described as an example.

In the present modification example, even if production errors that are not negligible are in the outer shape of the original lens 5, there is a method of enabling the optical properties of the optical unit 1 to be favorably corrected. For this reason, in the present modification example, an optical system in which production errors such that the optical properties of the second optical system deteriorate are included in the original lens 5 even if the first optical system is an optical system according to design values when being assembled to the small assembly 4. Here, in the additional lens portion 6 of the above first embodiment, the eccentricity variation at the assembly caused by the gap between the radial reference surface 5c of the original lens 5 and the second lens radial holding surface 3c cannot be corrected. Therefore, it is supposed that the errors of the external diameter of the radial reference surface 5c are within an allowable range.

The method for producing the optical unit 1 of the present modification example, as shown in FIG. 15, includes a first assembling step S21, a shape error measuring step S22, an optical property-measuring step S23, an optical parameter correction value-calculating step S24, a lens-producing step S25, and a second assembling step S26, and performs these steps in this order. Here, the shape error measuring step S22 may be ended until the optical parameter correction value-calculating step S24 is started, and execution timing is not limited to between the first assembling step S21 and the optical property-measuring step S23.

Hereinafter, differences from the above first embodiment will mainly be described.

The first assembling step S21 is the same step as the first assembling step S1 of the above first embodiment.

The shape error measuring step S22 is a step of measuring the shape errors of the original lens 5 used for the production of the second lens 7.

That is, in the present step, shape errors that greatly contribute to the optical properties in the optical unit 1, for example, the curvature radius, spacing, and eccentricity of the first lens surface 5a and the second lens surface 5b of the original lens 5.

The correction value analysis device 13 of the measuring device 20 can use the measurement results of these shape errors together with a serial number for identifying the original lens 5. For example, the measurement results of these shape errors, or the like are stored in an external storage of the correction value analysis device 13.

With the above, the shape error measuring step S22 is completed.

The optical property-measuring step S23 is the same step as the optical property-measuring step S2 of the above first embodiment.

The optical parameter correction value-calculating step S24, similar to the optical parameter correction value-calculating step S3 of the above first embodiment, is a step of obtaining the displacement amounts from the design values of the optical properties of the first optical system based on the measurement results of the optical properties, and changing the optical parameters of the second lens itself from the design values of the second lens, thereby calculating the correction values of the optical parameters of the second lens for correcting the displacement amounts.

Here, the present modification example is different from the above first embodiment in that the measurement values of the shape errors of the original lens 5 are included in the calculation of the correction values of the optical parameters.

In the present step, first, information on the predetermined shape errors of the original lens 5 assembled to the small assembly 4 is read from an external storage with reference to the measured identification information of the small assembly 4. Next, the correction value analysis device 13 calculates the correction values of the optical parameters corresponding to the third lens surface 6b to be created by the additional lens portion 6, when the original lens 5 including the shape errors is assembled to the small assembly 4 having the optical properties measured in the optical property-measuring step S23.

Specifically, the correction value analysis device 13 sets the arrangement of the third lens surface 6b, in consideration of the measurement results of the optical properties of the first optical system, and the shape errors regarding the arrangement position, arrangement orientation, and the surface shape of the first lens surface 5a. In that case, the arrangement of the third lens surface 6b is set under the conditions that the third lens surface 6b and the second lens surface 5b do not interfere with each other in consideration of the shape errors regarding the arrangement position, arrangement orientation, and surface shape of the second lens surface 5b.

For example, when the first lens surface 5a of the original lens 5 is eccentrically tilted with respect to the designed optical axis O5a or the arrangement position thereof in the direction along the optical axis with respect to the axial reference surface 5d deviates, candidates of the optical parameters of the third lens surface 6b for correcting the displacement amounts from the design values of the optical properties of the first optical system are set after the tilt eccentricity or the arrangement position in the direction along the optical axis is included, and the wave aberration after being transmitted through the third lens surface 6b is calculated.

In this case, if the candidates of the optical parameters of the third lens surface 6b are arbitrarily set, a positional relationship in which the third lens surface 6b and the second lens surface 5b interfere with each other is brought about depending on the shape errors of the original lens 5. Therefore, only optical parameters such that the third lens surface 6b is spaced apart from the whole second lens surface 5b and does not interfere with the second lens surface 5b are adopted.

The correction value analysis device 13 calculates the wave aberration after being transmitted through the third lens surface 6b based on the candidates of the optical parameters, and determines whether or not the displacement amount from the design value of the wave aberration is equal to or less than an allowable value.

When the allowable value is exceeded, setting of the candidates of the optical parameters of the third lens surface 6b is changed and the same calculation is calculated, and when the wave aberration is converged to the allowable value or less, the optical parameters are output as the correction values of the optical parameters.

With the above, the optical parameter correction value-calculating step S24 is completed.

The lens-producing step S25 and the second assembling step S26 are the same steps as the lens-producing step S4 and the second assembling step S5 of the above first embodiment.

The optical unit 1 can be produced in this way.

The first assembling step S21, the shape error measuring step S22, the optical property-measuring step S23, and the optical parameter correction value-calculating step S24 of the present modification example configure the method for designing a lens for assembly of the present modification example.

According to the present modification example, since the correction values of the optical parameters of the third lens surface 6b can be calculated based on the actual measurement values of the shape errors of the original lens 5, the optical unit 1 in which excellent optical properties are obtained can be produced even when the shape errors are in the original lens 5.

Second Embodiment

Next, a method for producing an optical assembly and a method for designing a lens for assembly in a second embodiment of the present invention will be described.

Figure 16:
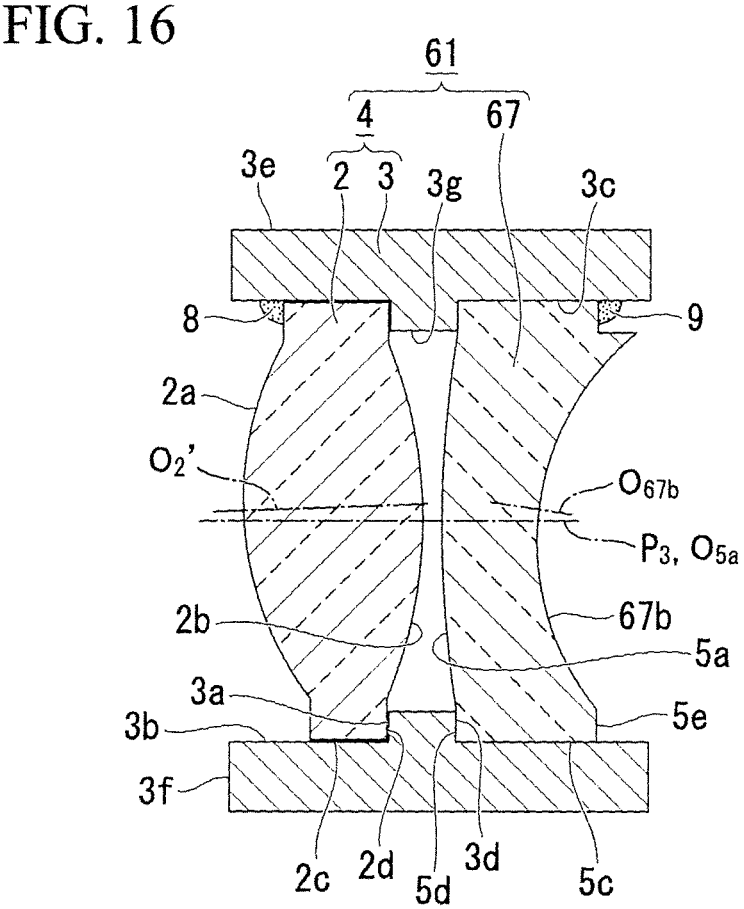
FIG. 16 is a cross-sectional view illustrating an example of an optical assembly that is assembled by a method for producing an optical assembly of a second embodiment of the present invention.
Figure 17A:
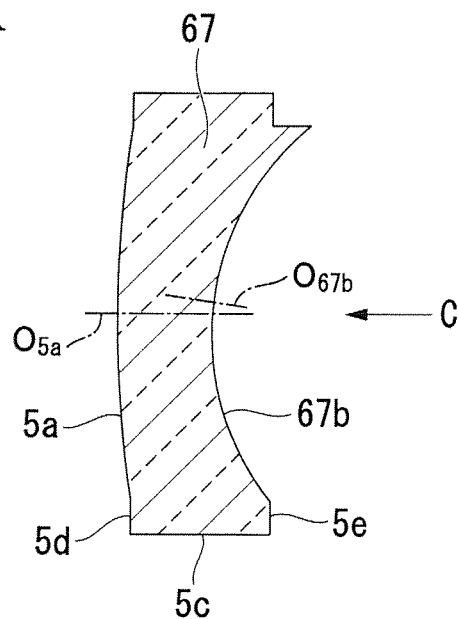
FIG. 17A is a cross-sectional view illustrating an example of a lens for assembly assembled to a pre-assembly of the second embodiment of the present invention.
Figure 17B:
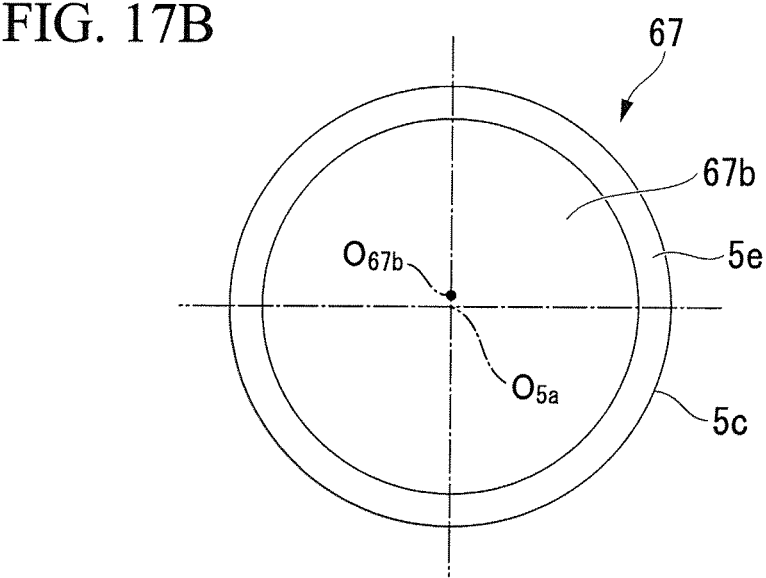
FIG. 17B is a view as viewed from C of FIG. 17A.

FIG. 16 is a cross-sectional view illustrating an example of an optical assembly that is assembled by the method for producing an optical assembly of the second embodiment of the present invention. FIG. 17A is a cross-sectional view illustrating an example of a lens for assembly assembled to a pre-assembly of the second embodiment of the present invention. FIG. 17B is a view as viewed from C in FIG. 17A.

The method for producing an optical assembly of the present embodiment is different from the above first embodiment in the method for producing the n-th lens. That is, in the first embodiment, the lens for assembly that is the n-th lens is produced based on the correction values by re-processing at least the lens surfaces of the original lens after the original lens is produced based on the design values of the optical parameters in the n-th lens. In contrast, in the present embodiment, the n-th lens having a shape based on the correction values of the optical parameters in the n-th lens is produced from a lens material.

Hereinafter, differences from the above first embodiment will mainly be described.

In the following, a case in which the optical assembly is an optical unit 61 shown in FIG. 16 will be described as an example.

The optical unit 61 includes a second lens 67 (an n-th lens or a lens for assembly) instead of the second lens 7 of the optical unit 1 in the above first embodiment.

The second lens 67 is a single lens that is produced from the same lens material as the original lens 5 of the above first embodiment, and includes a second lens surface 67b instead of the second lens surface 5b of the original lens 5.

The second lens surface 67b is a lens surface having the same surface shape, arrangement position, and arrangement orientation as the third lens surface 6b in the above first embodiment. Accordingly, an optical axis O67b of the second lens surface 67b is in the same positional relationship as the optical axis O6b of the third lens surface 6b in the above first embodiment with respect to the optical axis O5a of the first lens surface 5a.

For this reason, the second lens 67 has the same outer shape as the second lens 7 of the above first embodiment, is assembled to the small assembly 4 in the same positional relationship as the second lens 7, and is fixed similar to the second lens 7 by the bonding portion 9.

The optical unit 61 having such a configuration, as shown in FIG. 4, can be produced by performing a first assembling step S31, an optical property-measuring step S32, an optical parameter correction value-calculating step S33, a lens-producing step S34, and a second assembling step S35 in this order.

The first assembling step S31 and the optical property-measuring step S32 are respectively completely the same steps as the first assembling step S1 and the optical property-measuring step S2 of the above first embodiment.

The optical parameter correction value-calculating step S33 is almost the same step as the optical parameter correction value-calculating step S33 of the above first embodiment. That is, even when the optical parameters of the second lens surface 67b may be optical parameters according to the design values of the second surface of the second lens in terms of lens design, the same process is given except that the design values are output as the correction values of the optical parameters and the output destination of the processing information varies according to the difference of the lens-producing step S34.

The lens-producing step S34 is a step of producing the second lens 67 based on the correction values of the optical parameters calculated in the optical parameter correction value-calculating step S33.

The method for producing the second lens 67 is not particularly limited so long as a single lens-producing method is provided, suitable producing methods, for example, producing methods, such as cutting polishing processing and molding processing using a molding tool, can be used according to lens materials.

In the following, glass mold molding using a molding apparatus 70 shown in FIG. 18 will be described as an example.

The molding apparatus 70 includes a heating chamber 71 that heats and softens a glass material G (lens material), and a molding chamber 73 that is adjacent to the heating chamber 71 via an opening portion 73a in order to mold the softened glass material G. The opening portion 73a is made openable and closable by a shutter 73b, and the airtightness of the molding chamber 73 is maintained when the shutter 73b is closed.

A carrying-in port 71a provided in an openable and closable manner by a shutter (not shown) is provided in a side surface portion of the heating chamber 71 in order to carry in the glass material G held by a carrying unit 80, and the inside of the heating chamber is provided with a heater 72 that heats the glass material G.

The carrying unit 80 is adapted to be able to carry the heated and softened glass material G to the inside of the molding chamber 73 when the shutter 73b is opened.

The molding chamber 73 includes a vacuum pump and an inert gas supply source (not shown), and is adapted to be able to form a low-pressure inert atmosphere therein when the shutter 73b is closed.

A ceiling surface of the molding chamber 73 is provided with a stationary mold unit 78B (molding tool) having a molding surface 78b for transferring the surface shape of the second lens surface 67b of the second lens 67 to the glass material G.

A movable mold unit 78A (molding tool) that is movably supported by a molding tool moving unit 77 installed on a lower surface of the molding chamber 73 is arranged under the stationary mold unit 78B. An upper surface of the movable mold unit 78A is provided with a molding surface 78a for transferring the surface shape of the first lens surface 5a of the second lens 67 to the glass material G.

In addition, the temperature of the stationary mold unit 78B and the movable mold unit 78A is controlled by a heater (not shown).

In the molding tool moving unit 77, a Z-axis stage 74 that advances and retreats in a direction along a central axis O78b of the molding surface 78b corresponding to the optical axis O67b of the second lens surface 67b, an XY-axis stage 75 that is movable in two-axis directions orthogonal to each other and orthogonal to the central axis O78b, respectively, and a tilting stage 76 that is made tiltable in one-axis direction with respect to the central axis O78b and holds the movable mold unit 78A are sequentially loaded from the bottom surface of the molding chamber 73.

The molding tool moving unit 77 is communicably connected to a controller 79, and is adapted to control respective movement distances of the 2-axis stage 74, the XY-axis stage 75, and the tilting stage 76 according to control signals from the controller 79.

The controller 79 controls the operation of the molding tool moving unit 77 based on the processing information sent out from the correction value analysis device 13 so that the relative positional relationship of the molding surface 78a with respect to the molding surface 78b becomes a relative positional relationship equivalent to the correction values of the optical parameters calculated by the correction value analysis device 13.

In order to produce the second lens 67 with the molding apparatus 70 having such a configuration, first, the glass material G is carried into the heating chamber 71 by the carrying unit 80, and the glass material G is heated by the heater 72 until it is softened.

Figure 18:
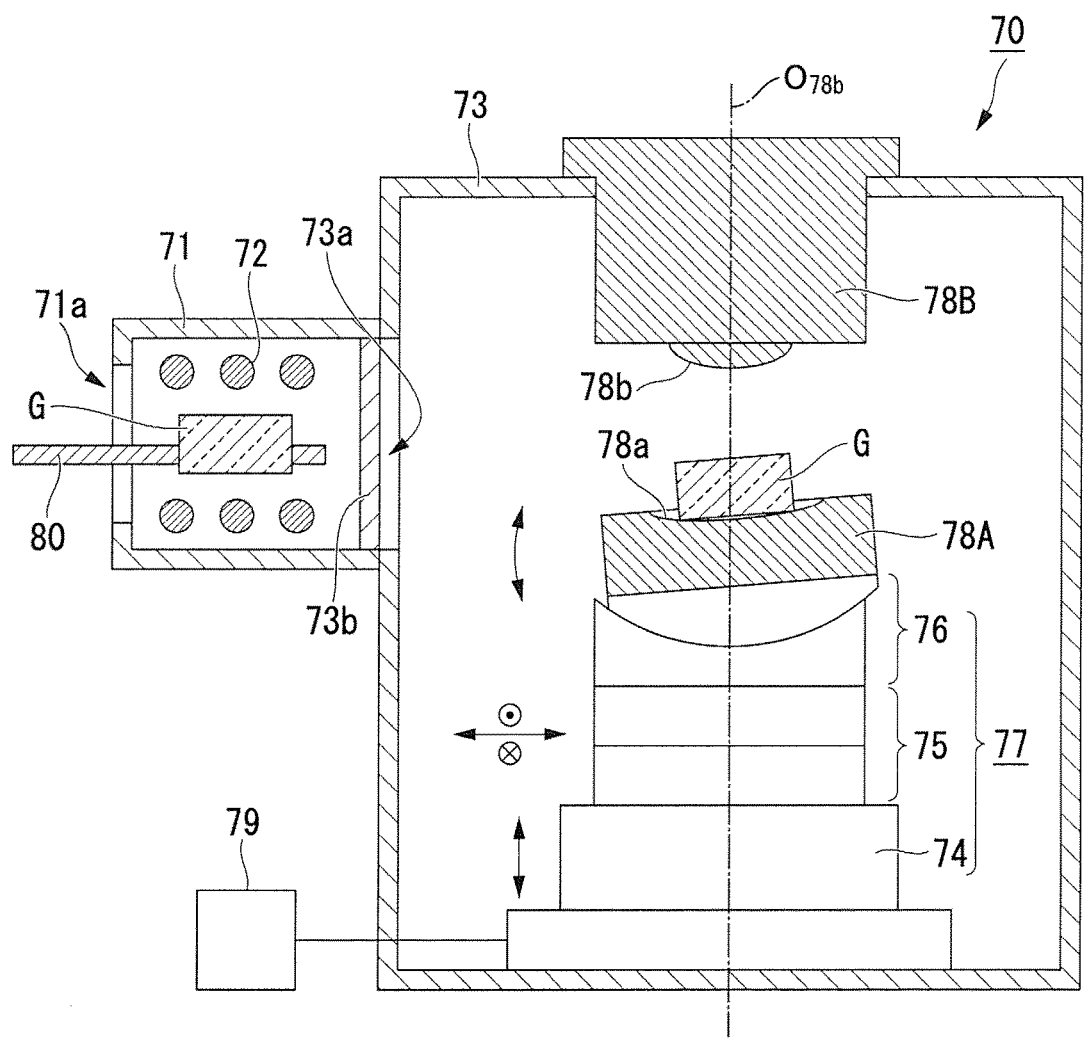
FIG. 18 is a schematic configuration view of a molding apparatus used for a lens-producing step of the method for producing an optical assembly of the second embodiment of the present invention.

Next, the shutter 73b is opened, the carrying unit 80 is driven, and the softened glass material G is carried into the molding chamber 73 brought into a low-pressure inert atmosphere, and as shown in FIG. 18, is placed on the molding surface 78a. After the end of the placement, the carrying unit 80 is retracted to the heating chamber 71, and the shutter 73b is closed.

In this case, the temperature of the stationary mold unit 78B and the movable mold unit 78A are raised to a temperature substantially equal to the glass material G.

Next, the controller 79 controls the driving amounts of the XY-axis stage 75 and the tilting stage 76, on the basis on the processing information sent out from the correction value analysis device 13, and matches the position of the molding surface 78a in a direction intersecting the central axis O78b and the inclination amount of this molding surface with respect to the central axis O78b with the position and the inclination amount of the first lens surface 5a with respect to the optical axis O67b in the second lens 67.

Next, the controller 79 raises the Z-axis stage 74 along the central axis O78b, the Z-axis stage is moved until the spacing between the molding surfaces 78b and 78a becomes equal to the spacing of the second lens 67, and the position thereof is held.

Accordingly, the glass material G sandwiched between the molding surfaces 78b and 78a is pressed and is deformed like the shape of the molding surfaces 78b and 78a. In this state, the stationary mold unit 78B and the movable mold unit 78A are lowered in temperature to cool down the glass material G.

If the cooling proceeds until the glass material G is cured, the controller 79 makes the Z-axis stage 74 lower to remove a molded product made of the glass material G from the mold units. The shapes of the molding surfaces 78a and 78b are transferred to the surface of this molded product, respectively, and the first lens surface 5a and the second lens surface 67b of the second lens 67 are molded from this.

The molded product removed from the mold units is taken out to the exterior of the molding chamber 73, and is subjected to centering with the molded first lens surface 5a as a reference, using a centering machine (not shown), and the shapes of the axial reference surface 5d, the radial reference surface 5c, and the planar portion Se are machined.

The second lens 67 is produced in this way, and the lens-producing step S34 is completed.

The second assembling step S35 to be performed next is exactly the same step as the second assembling step S5 of the above first embodiment.

The optical unit 61 can be produced in this way.

The first assembling step S31, the optical property-measuring step S32, and the optical parameter correction value-calculating step S33 of the present embodiment configure the method for designing a lens for assembly of the present embodiment.

In the optical unit 61 assembled in this way, since the external shape of the second lens 67 is formed based on the measurement results of the optical properties of the small assembly 4, degradation of the optical properties of the first optical system based on the displacement amounts from the design values of the optical parameters is corrected. For this reason, the wave aberration of a beam transmitted through the second lens 67 is corrected similar to the above first embodiment.

In this way, according to the producing method of the present embodiment, excellent optical properties can be obtained by simple work without adjusting an assembling position.

In addition, in the description of the above respective embodiments and respective modification examples, a case where the number N of lenses that configures the optical assembly is two and the first optical system includes only the first lens 2 has been described as an example. However, the number N of lenses of the optical assembly may be a suitable number of three or more, and the first optical system may be configured of two or more lenses. Additionally, optical elements may be included in the optical assembly in addition to the N lenses.

In the case of an optical assembly in which the number N of lenses of the optical assembly is three or more, the method for producing an optical assembly and the method for designing a lens for assembly according to the present invention can be applied to the assembly and design of one or more n-th lenses selected from a second lens to the N-th lens.

Additionally, in the description of the above respective embodiments and respective modification examples, the shift amounts and tilt amounts of the lens surfaces, the arrangement position of the entire optical system in the direction along the optical axis, and the spacing between the lens surfaces have been described as the optical parameters of the n-th lens. However, other optical parameters used for the design of the entire optical system, for example, the surface shapes of the lens surfaces, the refractive index between the lens surfaces, the Abbe number, and the like, which are expressed by curvature radii, the coefficients of an aspheric surface type and a free-form surface type, and the like, may be changed from design values.

Since the degree of freedom of the aberration correction is improved if such a configuration is adopted, more excellent correction of the optical properties is enabled.

For example, the refractive index of the additional lens portion 6 may be changed in the first embodiment. In this case, since refraction occurs in the second lens surface 5b, the second lens 7 can be regarded as the cemented lens having three lens surfaces, and the calculation of the wave aberration is enabled by changing the optical simulation of the respective optical parameters.

In the second embodiment, the refractive index can be changed from the design value by changing the quality of the glass material G of the second lens 67.

Additionally, in order to change the surface shapes of the lens surfaces, the curved surface type during cutting work may be changed or the molding surfaces of the molding tool may be changed.

Additionally, in the description of the above first embodiment and its modification examples, a case where the additional lens portion is molded from UV curable resin has been described as an example. However, the additional lens portion may be molded of photo-curable resin other than UV light, thermosetting resin, or the like.

Additionally, in the description of the third modification example of the first embodiment, a case where the original lens 5 or the jig lens in which the additional lens portion 6 is formed may be used as a temporary assembling lens has been described as an example. In this case, in order to estimate the optical properties of the first optical system precisely from the optical properties of a temporary assembled state, it is important that the optical parameters of the temporary assembling lens are known.

For this reason, it is preferable that the shape errors of the temporary assembling lens are negligible. However, even when the shape errors are not negligible, the optical properties of the first optical system can be precisely estimated by measuring the optical properties or shape errors of the temporary assembling lens, inputting the conditions of these actual measurement values to optical simulation software in advance, and removing the amount of contribution of the measurement values.

Additionally, in the description of the fourth modification example of the above first embodiment, a case where the gap between the second lens radial holding surface 3c and the radial reference surface 5c is sufficiently small has been described. However, the external diameter of the radial reference surface 5c may actually be measured in the shape error measuring step S22, and the second lens 7 may be biased in a constant direction when being assembled, in the second assembling step S26.

In this case, the amount of shift caused by the assembly errors becomes a known amount.

Accordingly, if the correction values of the optical parameters are calculated by including the shift amounts of the assembly errors in the optical parameter correction value-calculating step S24, excellent optical properties can be corrected even if the gap between the second lens radial holding surface 3c and the radial reference surface 5c is great.

Additionally, the constituent elements described in the above respective embodiments and respective modification examples may be embodied by appropriate combination or elimination in the scope of the technical idea of the present invention.

For example, in the producing method of the third modification example and the fourth modification example, the configuration of the lens for assembly may be a configuration like the second lenses 47 and 57 of the first modification example and the second modification example.

Additionally, for example, the second lens 57 of the second modification example has a configuration in which the axial positioning portion 46d of the first modification example is provided.

Additionally, for example, the methods of the optical property-measuring step S12 and the optical parameter correction value-calculating step S13 of the third modification example may be applied to the optical property-measuring step S23 and the optical parameter correction value-calculating step S24 of the fourth modification example.

While preferred embodiments of the present invention have been described, the present invention is not limited to the embodiments. Additions, omissions and substitutions, and other variations may be made to the present invention without departing from the spirit and scope of the present invention. The present invention is not limited by the above description, but by the appended claims.

What is claimed is:

1. A method for producing an optical assembly in which N (where N is an integer of two or more) lenses from a first lens to an N-th lens and a lens-holding member are assembled, the method comprising:
   a first assembling step of assembling lenses from the first lens to an (n−1)-th lens (where n is an integer of 1<n≤N) among the N lenses to the lens-holding member to assemble a pre-assembly;
   an optical property-measuring step of measuring an optical property of a first optical system including n−1 lenses in the pre-assembly or measuring an optical property of a second optical system formed by temporarily assembling a temporary assembling lens equivalent to the n-th lens based on the design value of a predetermined optical parameter to the pre-assembly;
   an optical parameter correction value-calculating step of obtaining a displacement amount from a design value of the optical property of the first optical system based on a measurement result of the optical property, and changing the optical parameter of at least the n-th lens itself from a design value thereof, thereby calculating a correction value of the optical parameter of the n-th lens that corrects the displacement amount;
   a lens-producing step of producing the n-th lens based on the correction value; and
   a second assembling step of assembling the n-th lens produced in the lens-producing step to the pre-assembly,
   wherein the optical assembly is produced by performing the first assembling step, the optical property-measuring step, the optical parameter correction value-calculating step, the lens-producing step, and the second assembling step in this order on at least one n-th lens.

2. The method for producing an optical assembly according to claim 1,
   wherein the optical parameter of the n-th lens itself is one or more kinds of optical parameters selected from a shift amount of a lens surface in a direction orthogonal to a reference axis of the n-th lens, a tilt amount of the lens with respect to the reference axis, a spacing between the lens surfaces, a surface shape of the lens surface, and a refractive index between the lens surfaces.

3. The method for producing an optical assembly according to claim 1,
   wherein the correction value of the optical parameter to be calculated in the optical parameter correction value-calculating step includes a correction value of the optical parameter that changes the arrangement of a lens surface of the n-th lens with respect to the lens-holding member.

4. The method for producing an optical assembly according to claim 1,
   wherein in the lens-producing step, the n-th lens is produced based on the correction value by re-processing at least a lens surface of an original lens after the original lens is produced based on the design value of the optical parameter in the n-th lens.

5. The method for producing an optical assembly according to claim 4,
   wherein the re-processing of the lens surface of the original lens is processing of forming an adding portion on the lens surface of the original lens through resin molding using a molding tool, thereby creating a lens surface based on the correction value on a surface of the adding portion.

6. The method for producing an optical assembly according to claim 1,
   wherein in the lens-producing step, an n-th lens having a shape based on the correction value of the optical parameter in the n-th lens is produced from a lens material.

7. The method for producing an optical assembly according to claim 6,
   wherein in the lens-producing step, the n-th lens is produced by molding the lens material using a molding tool.

8. The method for producing an optical assembly according to claim 1,
   wherein the size of at least an asymmetrical component in the optical property is measured in the optical property-measuring step, and
   wherein the correction value of the optical parameter is calculated as the displacement amount in the optical parameter correction value-calculating step so that the size of the asymmetrical component is corrected.

9. A method for designing an n-th lens among N (where N is an integer of two or more) lenses from a first lens to an N-th lens that configures an entire optical system, the method comprising:
   a first assembling step of assembling lenses from the first lens to an (n−1)-th lens (where n is an integer of 1<n≤N) among the N lenses to a lens-holding member to assemble a pre-assembly;
   an optical property-measuring step of measuring an optical property of a first optical system including n−1 lenses in the pre-assembly or measuring an optical property of a second optical system formed by temporarily assembling a temporary assembling lens equivalent to the n-th lens based on the design value of a predetermined optical parameter to the pre-assembly; and
   an optical parameter correction value-calculating step of obtaining a displacement amount from a design value of the optical property of the first optical system based on a measurement result of the optical property, and changing the optical parameter of at least the n-th lens itself from a design value thereof, thereby calculating a correction value of the optical parameter of the n-th lens that corrects the displacement amount,
   wherein a lens assembled to the pre-assembly as the n-th lens is designed based on the correction value.

* * * * *